United States Patent [19]
Yamaguchi et al.

[11] Patent Number: 5,570,851
[45] Date of Patent: Nov. 5, 1996

[54] REVERSE ROTATION PREVENTING MECHANISM IN SPINNING REEL FOR FISHING

[75] Inventors: Nobuyuki Yamaguchi; Kazuo Hirano, both of Tokyo, Japan

[73] Assignee: Daiwa Seiko, Inc., Tokyo, Japan

[21] Appl. No.: 311,122

[22] Filed: Sep. 23, 1994

Related U.S. Application Data

[63] Continuation-in-part of Ser. No. 39,682, Jan. 21, 1993, Pat. No. 5,374,001, which is a continuation of Ser. No. 645,708, Jan. 25, 1991, abandoned.

[30] Foreign Application Priority Data

Feb. 2, 1990 [JP] Japan .......................................... 2-9726
Apr. 26, 1990 [JP] Japan .......................................... 2-44979

[51] Int. Cl.⁶ ............................................... A01K 89/02
[52] U.S. Cl. .......................................... 242/247; 242/299
[58] Field of Search .................................. 242/247, 248, 242/298, 243, 295, 299

[56] References Cited

U.S. PATENT DOCUMENTS

| | | |
|---|---|---|
| 2,604,273 | 7/1952 | Hayes . |
| 3,146,966 | 9/1964 | Dunn ..................................... 242/298 X |
| 4,422,600 | 12/1983 | Preston ................................. 242/298 X |
| 4,515,325 | 5/1985 | Ito ........................................... 242/295 |
| 4,529,142 | 7/1985 | Yoshikawa ............................... 242/243 |
| 4,881,699 | 11/1989 | Emura ..................................... 242/248 |
| 5,020,738 | 6/1991 | Yamaguchi ......................... 242/247 X |
| 5,374,001 | 12/1994 | Yamaguchi et al. .................... 242/247 |

FOREIGN PATENT DOCUMENTS

| | | |
|---|---|---|
| 908659 | 4/1946 | France . |
| 53796 | 9/1946 | France . |
| 951895 | 11/1956 | Germany . |
| 954831 | 12/1956 | Germany . |
| 64-038963 | 3/1989 | Japan . |

*Primary Examiner*—Daniel P. Stodola
*Assistant Examiner*—Eileen A. Duan
*Attorney, Agent, or Firm*—Longacre & White

[57] ABSTRACT

A reverse rotation preventing mechanism in a spinning reel for fishing is characterized in that a rotor is secured to a rotary quill, which is rotated by the turning of a handle in kinematic conjunction therewith; a reverse rotation prevention member having reverse rotation prevention engagement portions is rotatably supported concentrically to the quill; a reverse rotation prevention claw is supported by the body of the reel so as to be swingable, and can be engaged with one of engagement portions; and a roller-type one-way clutch is provided between the rotor and the reverse rotation prevention member. When the rotor is reversely rotated in such a direction as to wind a fishline, the clutch member connects kinematically the rotor to the reverse rotation prevention member.

10 Claims, 19 Drawing Sheets

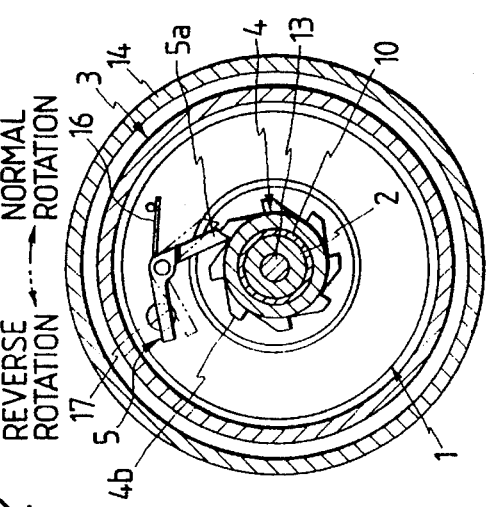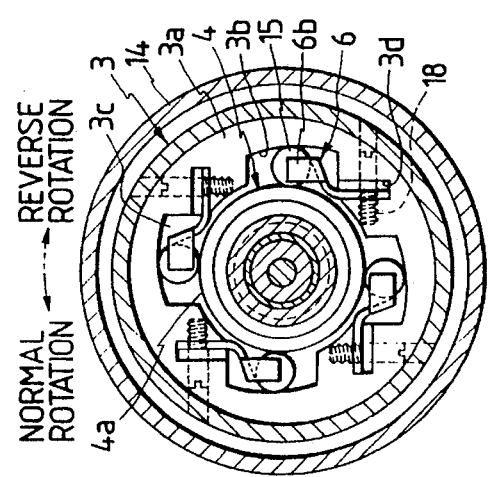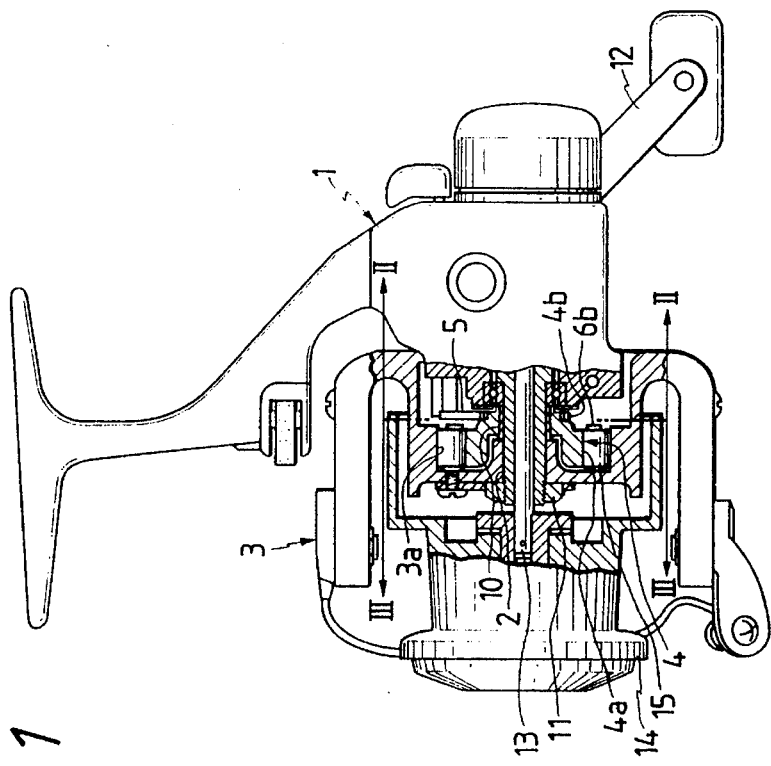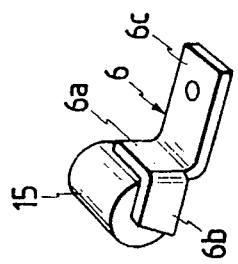

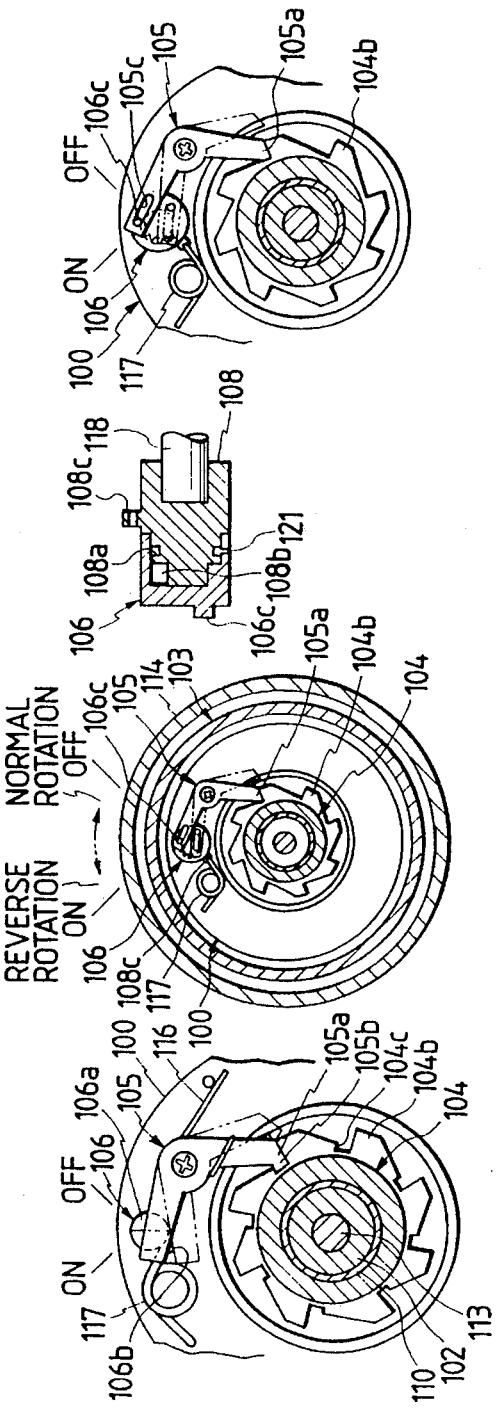

REVERSE ROTATION PREVENTING MECHANISM IN SPINNING REEL FOR FISHING

This is a continuation-in-part of application Ser. No. 08/039,682, filed Jan. 21, 1993, now U.S. Pat. No. 5,374,001, which is a continuation of application Ser. No. 07/645,708, filed Jan. 25, 1991, now abandoned.

BACKGROUND OF THE INVENTION

The present device relates to a reverse rotation prevention mechanism which is in a spinning reel for fishing and includes a roller-type clutch.

Although the reverse rotation of a ratchet is conventionally prevented by a reverse rotation prevention claw engaged with the ratchet, there is a problem that since the number of the teeth of the ratchet is small, the angle of the play of the ratchet until the completion of the prevention of the reverse rotation thereof is too large to quickly prevent the reverse rotation by engaging the claw with the ratchet.

To solve the problem, a reverse rotation prevention mechanism in which a roller-type one-way clutch is fitted in a ratchet not to rotate relative thereto and the rollers of the clutch are fitted in the peripheral portion of a rotary quill to make it possible to prevent the reverse rotation of the ratchet with less play thereof until the completion of the prevention was proposed as disclosed in the Japan Utility Model Application (OPI) No. 38963/89 (the term "OPI" as used herein means an "unexamined published application").

However, since the diameter of the rotary quill in which the rollers of the roller-type one-way clutch of the mechanism disclosed in the Japan Utility Model Application mentioned above are fitted is small, the circumferential velocity of the roller contact surface of the quill is so low that there is a problem that the rollers are not instantaneously and surely pinched between the quill and the ratchet to prevent the reverse rotation thereof. Besides, since the engagement surfaces of the components of the mechanism are likely to be locally loaded in the engagement of the components for the prevention of the reverse rotation of the ratchet so as to be deformed, there is a problem that the durability of the mechanism is low. In addition, since the roller-type one-way clutch is a generally purchasable one, the inside and outside diameters thereof are limited so as to lower the degree of freedom of design of the mechanism to cause a problem that the mechanism is not appropriate to a compact reel.

Further, since there is a resistance to the rotation of the roller-type one-way clutch itself in the direction for the disengagement thereof and the rotation speed of the rotor of the spinning reel or that of the spool of a reel whose spool shaft is supported at both the ends thereof has an influence, the ratchet is rotated in kinematic conjunction with the rotation of the rotor or the spool in the direction for the winding of the fishline so as to move the claw out of the position of the engagement with the ratchet to make it impossible to instantaneously prevent the reverse rotation of the rotor of the spool.

SUMMARY OF THE INVENTION

The present device was made in order to solve the problems mentioned above. Accordingly, it is an object of the device to provide a reverse rotation prevention mechanism which is for a spinning reel for fishing and is such that the reverse rotation of the rotor of the reel is instantaneously and surely prevented by the mechanism, the durability of the mechanism is high, the dimensions of the mechanism are not much restricted, the degree of freedom of design of the mechanism is high, and the mechanism is appropriate to a compact reel as well.

In the reverse rotation prevention mechanism provided in accordance with the present invention, the rotor is secured to a rotary quill, which is rotated by the turning of a handle in kinematic conjunction therewith, a reverse rotation prevention member having reverse rotation prevention engagement portions is rotatably supported concentrically to the quill, a reverse rotation prevention claw is supported by the body of the reel so as to be swingable and is urged by a spring so as to be capable of being engaged with one of the engagement portions, and a roller-type clutch is provided between the rotor and the reverse rotation prevention member so as to kinematically connect the rotor and the member to each other when the rotor is reversely rotated in such a direction as to unwind a fishline.

BRIEF DESCRIPTION OF THE DRAWINGS

FIG. 1 is a partially sectional side view of a spinning reel which is for fishing and provided with a reverse rotation prevention mechanism which is a first embodiment of the present device;

FIG. 2 is an enlarged sectional view of the reel along a line II—II shown in FIG. 1;

FIG. 3 is an enlarged sectional view of the reel along a line III—III shown in FIG. 1;

FIG. 4 is a perspective view of the spring of the mechanisms;

FIG. 15 is an enlarged sectional view of a major part of the mechanism;

FIG. 16 is a sectional view of a reverse rotation prevention mechanism which is a sixth embodiment of the present device and is for a spinning reel for fishing, along a line corresponding to that XIII—XIII shown in FIG. 12, in the state that an engagement claw is engaged with a ratchet;

FIG. 17 is a sectional view of a the cam member of the mechanism shown in FIG. 16;

FIGS. 18 and 19 are enlarged sectional views of a major part of the mechanism shown in FIG. 16;

FIG. 20 is a sectional view of the major part in the state that the claw is disengaged from the ratchet;

FIG. 21 is a sectional view of a major part of a reverse rotation prevention mechanism which is an alternate embodiment of the mechanism shown in FIG. 16;

DETAILED DESCRIPTION OF THE PREFERRED EMBODIMENT

Figure 6:
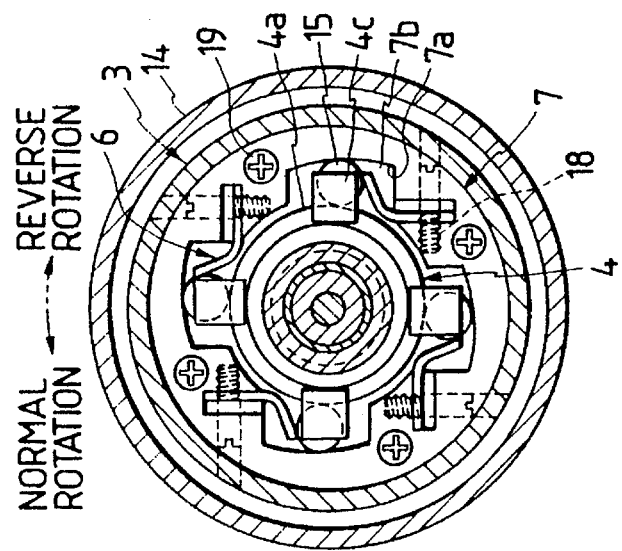
FIG. 6 is an enlarged sectional view of the reel along a line VI—VI shown in FIG. 5.

Embodiments of the present device are hereafter described with reference to the drawings attached hereto.

FIGS. 1, 2, 3 and 4 show a reverse rotation prevention mechanism which is the first embodiment and is for a spinning reel for fishing. In the reel, a ring 10 is fitted on a rotary quill 2 projecting forward from the body 1 of the reel, and a rotor 3 is fitted on the quill in front of the ring and secured to the quill by a nut 11, as shown in FIG. 1, so that the rotor is rotated by the turning of a handle 12 in kinematic conjunction therewith. A spool 14 is supported on the front end portion of a spool shaft 13 fitted in the rotary quill 2 and projecting therefrom, so that the spool is reciprocated backward and forward by the turning of the handle 12 in kinematic conjunction therewith.

A reverse rotation prevention member 4 is rotatably supported on the ring 10, and includes a perfectly circular portion 4a on which a plurality of rollers 15 are provided, and a plurality of reverse rotation prevention engagement portions 4b. The tip portion 5a of a reverse rotation prevention claw 5 is located near the reverse rotation prevention engagement portions 4b of the member 4 so that the tip portion can be engaged with one of the engagement portions, as shown in FIG. 2. The claw 5 is supported by the body 1 of the reel so that the claw can be swung. A spring 16 urges the claw 5 in such a direction as to engage the tip portion 5a thereof with one of the rotation prevention engagement portions 4b. The position of the claw 5 is controlled by a cam member 17 so that the tip portion 5a of the claw is engaged with or disengaged from the engagement portion 4b.

The rotor 3 has an annular projection 3a extending in the rear recess of the rotor and having a plurality of recesses 3c having bottoms 3b extending nearly in the circumferential direction of the rotor and slightly outward in the direction of the reverse rotation of the rotor, as shown in FIG. 3. The rollers 15 are provided in the recesses 3c and urged by springs 6 counterclockwise with regard to FIG. 3. Each of the springs 6 includes pushing portion 6a for pushing the roller 15 on the outside circumferential surface thereof, a coming-off prevention portion 6b located in contact with the end face of the rotor to prevent it from coming off, and a secured portion 6c, as shown in FIG. 4. The secured portion 6c is fitted in the groove 3d of the annular projection 3a of the rotor 3 and secured thereto by a screw 18.

The roller-type clutch of the reverse rotation prevention mechanism includes the reverse rotation prevention member 4, the recesses 3c, the rollers 15, and the springs 6. When the handle 12 is turned in such a direction that a fishline not shown in the drawings is wound on the spool 14, the rotor 3 is rotated clockwise with regard to FIG. 2 and the rotary quill 2 and the rotor are rotated counterclockwise with regard to FIG. 3. At that time, the rollers 15 are rotated in the recesses 3c so that the rotor 3 and the reverse rotation prevention member 4 are not kinematically connected to each other. For that reason, the member 4 engaged at the engagement portion 4b thereof with the tip portion 5a of the reverse rotation prevention claw 5 as shown in FIG. 2 is not rotated. When the fishline wound on the spool 14 is then unwound therefrom by the pull of a fish, the rotor 3 is reversely rotated counterclockwise with regard to FIG. 2 or clockwise with regard to FIG. 3. At that time, because of the reverse rotation of the rotor 3, each of the rollers 15 is pinched between the perfectly circular portion 4a of the reverse rotation prevention member 4 and the bottom 3b of the recess 3c of the rotor so that the rotor and the member are kinematically connected to each other to transmit the torque of the rotor to the member to rotate it in the same direction as the rotor. However, since the engagement portion 4b of the member 4 is already engaged with the tip portion 5a of the reverse rotation prevention claw 5 as shown in FIG. 2, the member cannot be rotated, namely, the rotor 3 cannot be reversely rotated any more. If the claw 5 is swung counterclockwise by the cam member 17 against the urging force of the spring 16 in advance, as shown by a two dot chain line in FIG. 2, so that the tip portion 5a of the claw is disengaged from the engagement portion 4b of the member 4, the rotor 3 and the member can be reversely rotated continuously.

Since the perfectly circular portion 4a of the reverse rotation prevention member 4 is large in diameter, the circumferential velocity of the roller contact surface of the portion is high enough to immediately prevent the reverse rotation of the rotor 3 and reverse rotation prevention mechanism is high in durability. Since the mechanism is not much restricted of the dimensions thereof, the mechanism is high in the degree of freedom of design. Therefore, the mechanism is appropriate to a compact reel as well.

Figure 5:
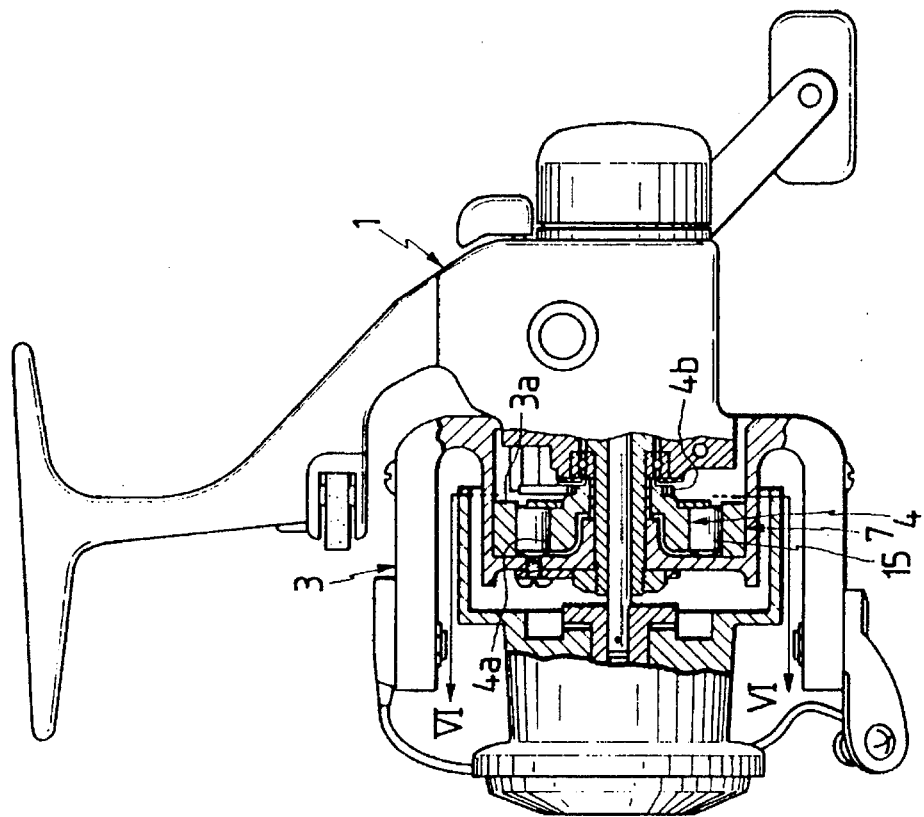
FIG. 5 is a partially sectional side view of a spinning reel which is for fishing and provided with a reverse rotation prevention mechanism which is a second embodiment of the invention.

FIGS. 5 and 6 show a reverse rotation prevention mechanism which is a modification of the embodiment described above. In the modification, a rotor 3 has an annular projection 3a formed separately from the body of the rotor. A ring 7 of the same form as the annular projection 3a is secured to the rotor 3 by a plurality of screws 19. A reverse rotation prevention member 4 includes a perfectly circular portion 4a on which a plurality of rollers 15 are provided, a plurality of reverse rotation prevention engagement portions 4b, and a plurality of roller coming-off prevention portions 4c for preventing the rollers from coming off. Springs 6 have no roller coming-off prevention portion. The ring 7 has a plurality of recesses 7b having bottoms 7a extending nearly in the circumferential direction of the ring and slightly outward in the direction of the reverse rotation of the rotor 3. The springs 6 and the roller coming-off prevention portions 4c in the embodiment and the modification may be otherwise shaped and secured. The modification is the same in operation and effect as the embodiment.

Figure 8:
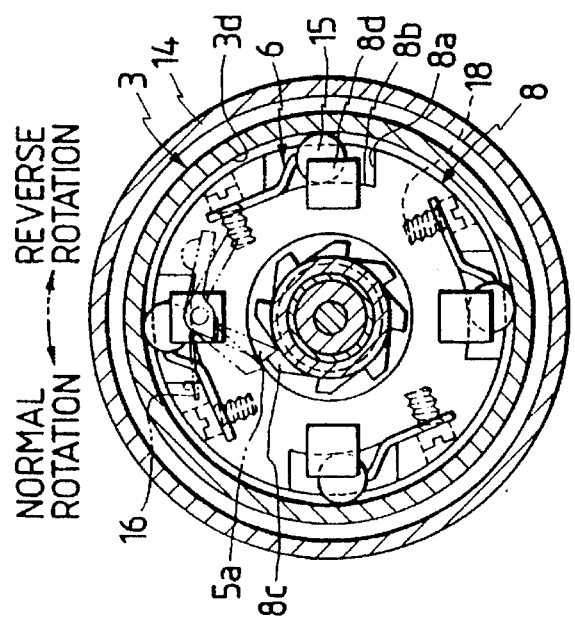
FIG. 8 is an enlarged sectional view of the reel along line VIII—VIII shown in FIG. 7.
Figure 7:
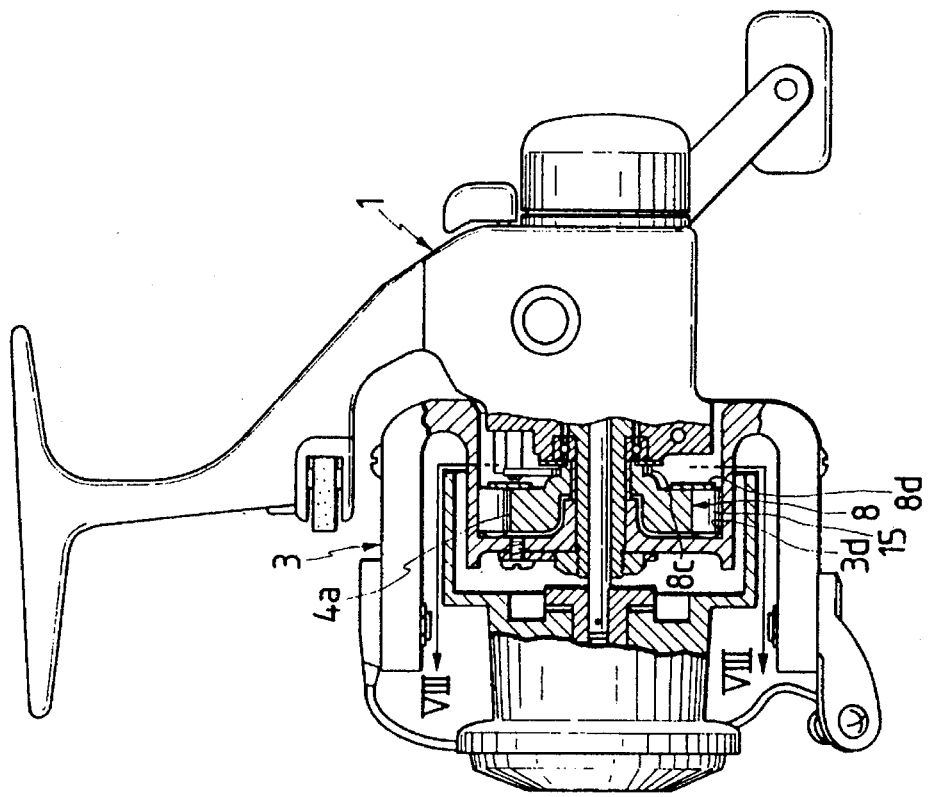
FIG. 7 is a partially sectional side view of a spinning reel which is for fishing and provided with a reverse rotation prevention mechanism which is a third embodiment of the present device.

FIGS. 7 and 8 show a reverse rotation prevention mechanism which is the second embodiment and is for a spinning reel for fishing. In the reel, a rotor 3 is not provided with an annular projection and a ring such as those 3a and 7 in the preceding embodiment, and a reverse rotation prevention member 8 has recesses 8a in which rollers 15 are provided and which have bottoms 8b extending nearly in the circumferential direction of the member and slightly outward in the direction of the reverse rotation of the rotor. The member 8 further includes a plurality of reverse rotation prevention engagement portions 8c, and coming-off prevention portions 8d. The rollers 15 are provided in the recesses 8a of the member 8 and located in contact with the inside circumferential surface 3d of the rotor 3, which extends around the recess of the rotor. Springs 6 for pushing the rollers 15 may be either provided or not provided. As shown in FIG. 8, the tip portion 5a of a reverse rotation prevention claw 5a is located near the engagement portions 8c of the reverse rotation prevention member 8 so that the tip portion can be engaged with one of the engagement portions. The claw 5 is supported by the body 1 of the reel so that the claw can be swung. A spring 16 urges the claw 5 in such a direction as to engage the tip portion 5a thereof with one of the engagement portions 8c.

When the handle 12 of the reel shown in FIGS. 7 and 8 is turned in such a direction that a fishline not shown in the drawings is wound on a spool 14, the rotor 3 is rotated counterclockwise with regard to FIG. 8. At that time, the rollers 15 are rotated in the recesses 8a of the reverse rotation prevention member 8 so that the rotor 3 and the member are not kinematically connected to each other. For that reason, the member 8 engaged at the engagement portion 8c thereof with the tip portion 5a of the reverse rotation prevention claw 5 is not rotated. When the fishline wound on the spool 14 is then unwound therefrom by the pull of a fish, the rotor 3 is reversely rotated clockwise with regard to FIG. 8. At that time, because of the reverse rotation of the rotor 3, each of the rollers 15 is pinched between the inside circumferential surface 3d of the rotor and the bottom 8b of the recess 8a of the member 8 so that the rotor and the member are kinematically connected to each other to transmit the torque of the rotor to the member to rotate it in the same direction as the rotor. However, since the engagement portion 8c of the member 8 is already engaged with the tip portion 5a of the claw 5 as shown in FIG. 8, the member cannot be rotated, namely, the rotor 3 cannot be reversely rotated any more.

Figure 10:
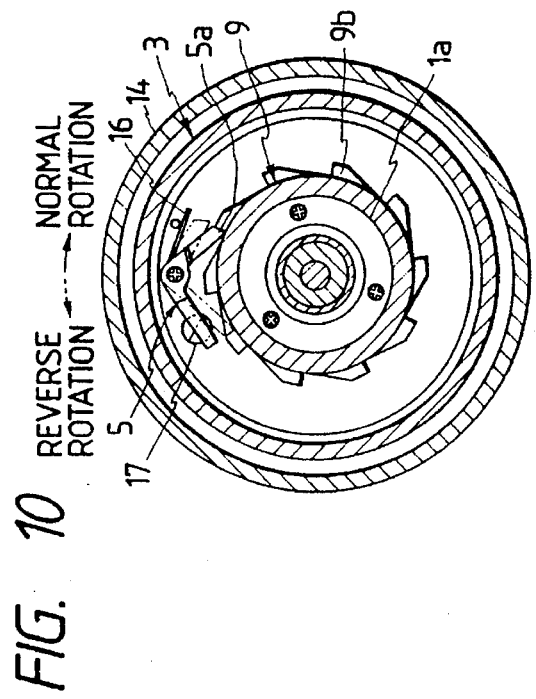
FIG. 10 is an enlarged sectional view of the reel along a line X—X shown in FIG. 9.
Figure 11:
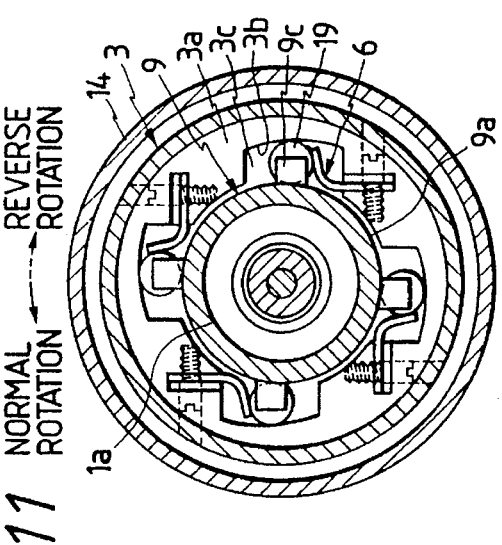
FIG. 11 is an enlarged sectional view of the reel along a line XI—XI shown in FIG. 9.
Figure 9:
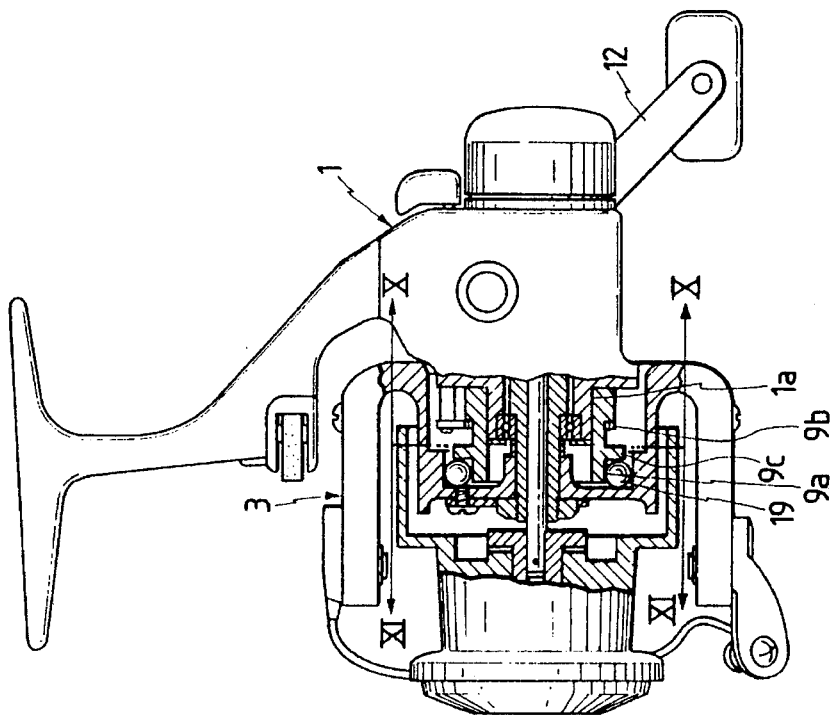
FIG. 9 is a partially sectional side view of a spinning reel which is for fishing and provided with a reverse rotation prevention mechanism which is a fourth embodiment of the present device.
Figure 12:
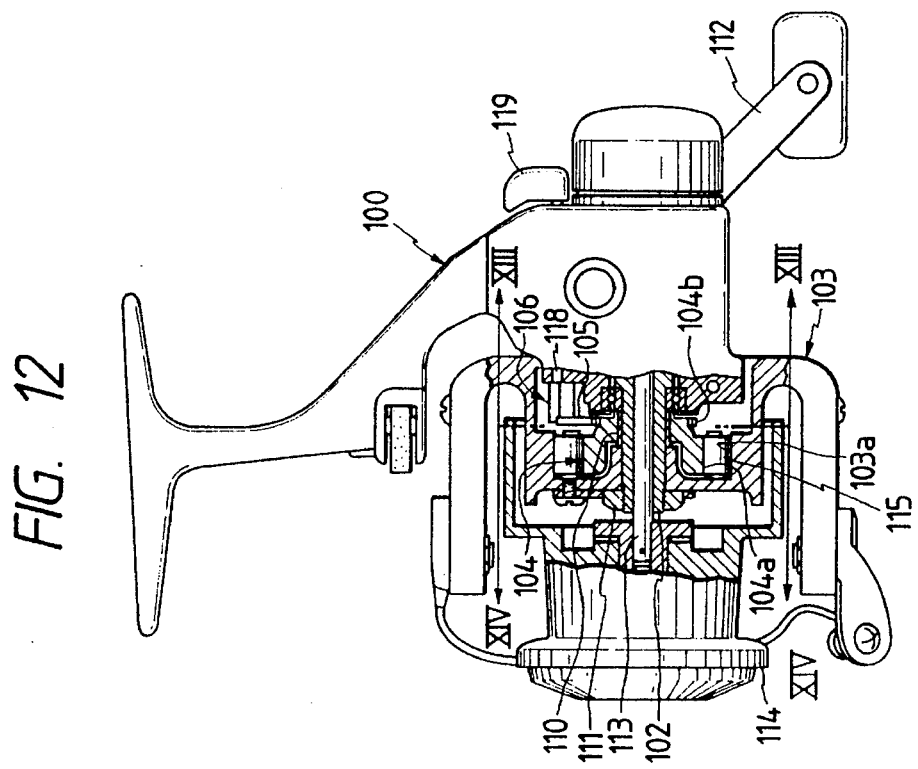
FIG. 12 is a partially sectional side view of a spinning reel which is for fishing and provided with a reverse rotation prevention mechanism which is a fifth embodiment of the present device.

FIGS. 9, 10 and 11 show a reverse rotation prevention mechanism which is the third embodiment and is for a spinning reel for fishing. In the reel, a rotor 3 has annular projection 3a of the same form as that shown in FIGS. 1 and 3, and a reverse rotation prevention member 9 is rotatably supported on the outside circumferential surface of a cylindrical portion 1a projecting forward from the body 1 of the reel, and includes a perfectly circular portion 9a on which balls 19 are provided, a plurality of reverse rotation prevention engagement portions 9b, and ball coming-off prevention portions 9c located in contact with the spherical surfaces of the balls to prevent them from coming off. As shown in FIG. 10, the tip portion 5a of a reverse rotation prevention claw 5 is located near the reverse rotation prevention portions 9b of the member 9 so that the tip portion can be engaged with one of the reverse rotation prevention portions. The claw 5 is supported by the body 1 of the reel so that the claw can be swung. A spring 16 urges the claw 5 in such a direction as to engage the tip portion 5a thereof with the engagement portion 9b of the member 9. The position of the claw 5 is controlled by a cam member 17 so that the tip portion 5a of the claw 5 is engaged with or disengaged from the engagement portion 9b of the member 9. The rotor 3 has the annular projection 3a formed in the rear recess of the rotor and having a plurality of recesses 3c having bottoms 3b extending nearly in the circumferential direction of the projection and slightly outward in the direction of the reverse rotation of the rotor, as shown in FIG. 11. The balls 19 are provided in the recesses 6c. Springs 6 urge the balls 19 counterclockwise with regard to FIG. 11.

When the handle 12 of the reel shown in FIGS. 9, 10 and 11 is turned in such a direction that a fishline not shown in the drawings is wound on a spool 14, the rotor 3 is rotated clockwise with regard to FIG. 10 and a rotary quill 2 and the rotor are rotated counterclockwise with regard to FIG. 11. At that time, the balls 19 are rotated in the recesses 3c so that the rotor 3 and the reverse rotation prevention member 9 are not kinematically connected to each other. For that reason, the member 9 engaged at the engagement portion 9b thereof with the tip portion 5a of the claw 5 as shown in FIG. 10 is not rotated. When the fishline wound on the spool 14 is then unwound therefrom by the pull of a fish, the rotor 3 is reversely rotated counterclockwise with regard to FIG. 10 or clockwise with regard to FIG. 11. At that time, because of the reverse rotation of the rotor 3, each of the balls 19 is pinched between the perfectly circular portion 9a of the member 9 and the bottom 3b of the recess 3c so that the rotor and the member are kinematically connected to each other to transmit the torque of the rotor to the member to rotate it in the same direction as the rotor. However, since the engagement portion 9b of the member 9 is already engaged with the tip portion 5a of the claw 5 as shown in FIG. 10, the member cannot be rotated, namely, the rotor cannot be reversely rotated any more. If the claw 5 is swung counterclockwise against the urging force of the spring 16 in advance as shown by a two-dot chain line in FIG. 10, the rotor 3 can be reversely rotated continuously.

FIGS. 12, 13, 14, 15 and 16 show a reverse rotation prevention mechanism which is the fourth embodiment and is in a spinning reel for fishing.

Figure 13:
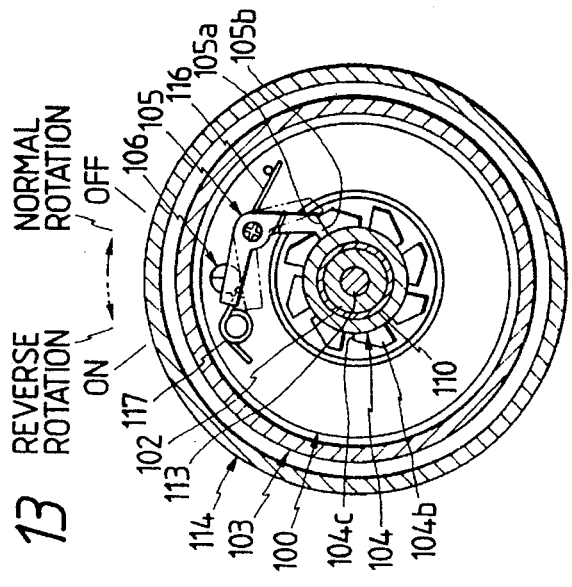
FIG. 13 is a sectional view of the mechanism along a line XIII—XIII shown in FIG. 12, in the state that an engagement claw is engaged with a ratchet.
Figure 14:
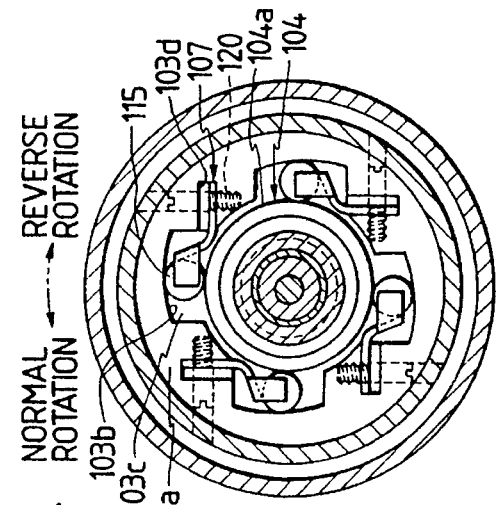
FIG. 14 is a sectional view of the mechanism along a line XIV—XIV shown in FIG. 12.

In this embodiment, the position of the claw 105 is controlled by a cam 6a of cam member 106 so that the claw can be engaged with or disengaged from the ratchet 104b. A torsion spring 117 is provided between the body 101 of the reel and the spring engagement part 106b of the cam member 106. The cam member 106 is secured to a manipulation bar 118 at the front end portion thereof. A knob 119 is secured to the bar 118 at its rear portion projecting from the rear of the reel body 101. FIGS. 13 and 15 show the state that the knob 119 is swung into an engagement position ("ON" position) to engage the engagement portion 105b of the claw 105 in the notch 104c of the ratchet 104b.

Since the resistance acts to the rotation of the roller-type one-way clutch in the direction for the disengagement thereof and the rotation speed of the rotor has the influence, the ratchet 104b would be likely to be rotted in kinematic conjunction with the rotation of the rotor 103 in the direction of the winding of the fishline. However, in the reverse rotation prevention mechanism, the ratchet 104b has the notches 104c, the claw 105 has the engagement portion 105b to be engaged in the notch, and the notch, the engagement portion and the spring 116 constitute the means for preventing the claw from being disengaged from the ratchet, the rotary member 104 and the ratchet thereof are prevent from being rotated in kinematic conjunction with the rotation of the rotor 103 in the direction of the winding of the fishline. For that reason, the rotor 103 and the rotary member 104 are instantaneously prevented from being reversely rotated.

FIGS. 16, 17, 18, 19 and 20 show a reverse rotation prevention mechanism which is the fifth embodiment and is for a spinning reel for fishing. The mechanism includes a deformed cam member 106 for manipulating a reverse rotation prevention engagement claw 105, but does not include a member such as the spring 116 of the preceding embodiment. The ratchet 104b of the rotary member 104 of the mechanism does not have notches such as those of the preceding embodiment. The claw 105 does not have an engagement portion which is a stepped portion, at the tip portion 105a of the claw. The cam member 106 is fitted on a secured member 108 secured to a manipulation bar 118, so that the cam member can be swung. A screw 121 is engaged in the cam member 106 and fitted in the groove 108a of the secured member 108 to prevent the cam member from coming off the secured member. The cam member 106 is formed with a pin 6c put in the slender hole 5c of the claw 105. When a knob 119 is in an engagement position ("ON" position), the pin 106c is located slightly rightward from a vertical line with regard to FIG. 16. A projection 108b is provided on the outside circumferential surface of the front end portion of the secured member 108 and fitted in the arc-shaped recess 106d of the cam member 106. A spring 122 is provided between the projection 108b and the cam member 106, and urges the cam member. The secured member 108 has a spring engagement portion 108c with which a torsion spring 117 is engaged.

When the handle 112 of the reel shown in FIGS. 16, 17, 18, 19 and 20 is turned in such a direction that a fishline not shown in the drawings is wound on a spool 114, the rotor 103 is rotated counterclockwise with regard to FIG. 16, 17, 18 and 19. At that time, the rollers 115 are rotated in the recesses 103c so that the rotor 103 and the rotary member 104 are not kinematically connected to each other, in the same manner as preceding embodiment. Since the pin 106c put in the slender hole 105c of the claw 105 is located slightly rightward from the vertical line with regard to FIG. 16 so that the tip portion 105a of the claw is pushed on the ratchet 104b, the rotary member 104 is not rotated. Since there is a resistance to the rotation of the roller-type one-way clutch of the reverse rotation prevention mechanism in the direction for the disengagement of the clutch and the rotation speed of the rotor 103 has an influence, the ratchet 104b would be likely to be rotated in kinematic conjunction with the rotation of the rotor in the direction of the winding of the fishline. However, since the pin 106c in the slender hole 105c of the claw 105 is located slightly rightward from the vertical line with regard to FIG. 16, the cam member 106 and the claw are not swung, so that a means for preventing the claw from being disengaged from the ratchet 104b acts to surely keep the rotary member 104 from being rotated in kinematic conjunction with the rotation of the rotor 103 in the direction for the winding of the fishline. When the fishline wound on the spool 114 is then unwound therefrom by the pull of a fish, the rotor 103 is reversely rotated counterclockwise with regard to FIG. 16. Because of the reverse rotation of the rotor 103, each of the rollers 115 is pinched between the bottom of the recess 103c and the perfectly circular portion 104c of the rotary member 104 so that the rotor and the member are kinematically connected to each other to transmit the torque of the rotor to the member to rotate it in the same direction as the rotor. However, since the ratchet 104b of the rotary member 104 is already engaged with the tip portion 105a of the claw 105 as shown in FIGS. 16, 17, 18 and 19, the rotary member cannot be rotated, namely, the rotor 103 cannot be reversely rotated any more. If the claw 105 is swung counterclockwise by the cam member 106 in advance, as shown in FIG. 20, so that the claw is disengaged from the ratchet 104b, the rotor 103 and the rotary member 104 can be reversely rotated continuously.

When the knob 119 is swung from a disengagement position ("OFF" position) shown by a full line in FIG. 20 to the engagement position ("ON" position) shown by a two-dot chain in line in FIG. 20, so that the tip portion 105a of the claw 105 is put on the tooth of the ratchet 104b, the spring 122 provided between the projection 108b of the secured member 108 and the cam member 106 at the arc-shaped recess 106d is once compressed to make it possible to swing the knob from the disengagement position to the engagement position.

The ratchet 104b and the claw 105 may be provided with notches and an engagement portion, respectively, in the same manner as the preceding embodiment.

FIG. 21 shows a reverse rotation prevention mechanism which is a modification of the embodiment shown in FIGS. 16, 17, 18, 19 and 20. In the mechanism, a cam member 106 has a groove 106e instead of a pin, a reverse rotation prevention engagement claw 105 has a pin 105d fitted in the groove.

Figure 23:
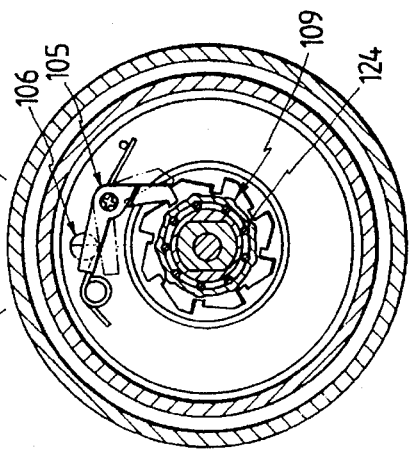
FIG. 23. is a sectional view of the mechanism along a line XXIII—XXIII shown in FIG. 22.
Figure 24:
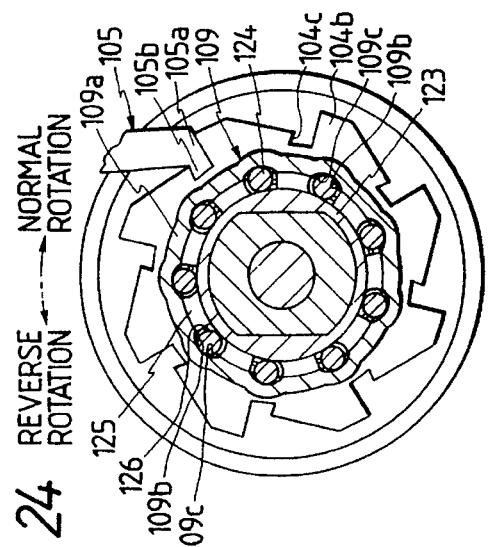
FIG. 24 is an enlarged sectional view of the mechanism along the line XXIII—XXIII of FIG. 22.
Figure 22:
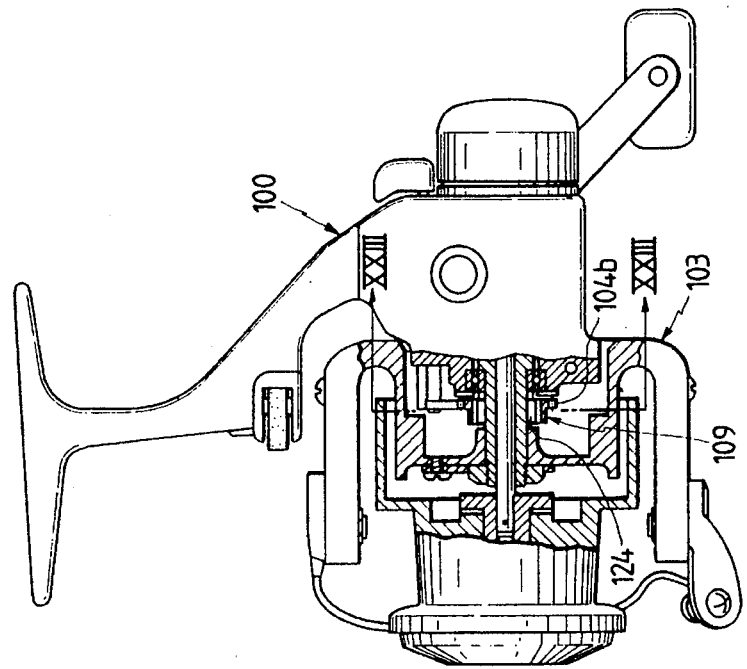
FIG. 22 is a partially sectional side view of a spinning reel which is for fishing and provided with a reverse rotation prevention mechanism which is a seventh embodiment of the present device.

FIGS. 22, 23 and 24 show a reverse rotation prevention mechanism which is the sixth embodiment and is for a spinning reel for fishing. Although the roller-type one-way clutch of the reverse rotation prevention mechanism shown in FIG. 12 includes the rotary member 104, the recesses 103c, the rollers 115 and the springs 107, that of the reverse rotation prevention mechanism shown in FIG. 22 includes a plurality of roller 124 fitted in the peripheral portion of a ring 123 fitted on the outside circumferential surface of a rotary quill 102, a rotary member 104 having a ratchet 104b having notches 104c and constituting the peripheral portion of the clutch, an outer ring 109a, recesses 109b provided in the inner circumferential portion of the outer ring, slopes 109d provided on the portion, spacers 125, and springs 126, as shown in FIGS. 23 and 24. The rollers 124 are kept at equal intervals by the spacers 125. The springs 126 urge the rollers 124 toward the slopes 109d.

When the rotary quill 102 of the fishing reel shown in FIG. 22 is turned clockwise with regard to FIG. 24, the rollers 124 of the roller-type one-way clutch 109 are pushed clockwise and located in the recess 109b of the outer ring 109a so that the quill can be smoothly rotated continuously. When the quill 102 is then reversely rotated counterclockwise with regard to FIG. 24, the rollers 124 are pushed counterclockwise and located in pressure contact with the slopes 109d of the outer ring 109a so that the quill and the rotary member 104 are kinematically connected to each other to transmit the torque of the quill to the rotary member through the outer ring to rotate the member in the same direction as the quill. In that case, the quill 102 and the rotary member 104 cannot be reversely rotated continuously if a reverse rotation prevention engagement claw 105 is engaged with the ratchet 104b of the rotary member, and the quill and the rotary member can be reversely rotated continuously if the claw is disengaged from the ratchet, similarly to the embodiment shown in FIG. 12. The engagement and disengagement of the claw 105 and the ratchet 105 are performed in the same manner as the embodiment shown in FIG. 12.

Although the embodiments described above are for the spinning reels, the present invention is not confined thereto but may be embodied for another type of a reel such as a reel whose spool shaft is supported at both the ends thereof. As for the embodiment for the other type of the reel, the above sentence "since the rotation speed of the rotor 103 has an influence, the ratchet 104b would be likely to be rotated in kinematic conjunction with the rotation of the rotor in the direction for the winding of the fishline." is replaced by a sentence "since the rotation speed of a spool has an influence, a ratchet would be likely to be rotated in kinematic conjunction with the rotation of the spool in the direction for the winding of a fishline or with the rotation of a drive member which is rotated in kinematic conjunction with the spool."

Figure 25:
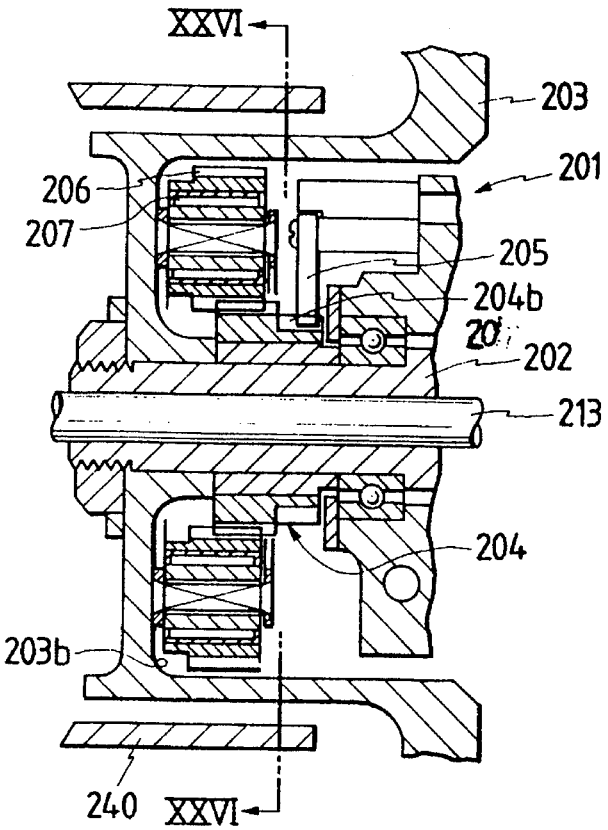
FIG. 25 is a partially sectional side view of a spinning reel which is for fishing and provided with a reverse rotation prevention mechanism which is an eight embodiment of the present invention.
Figure 26:
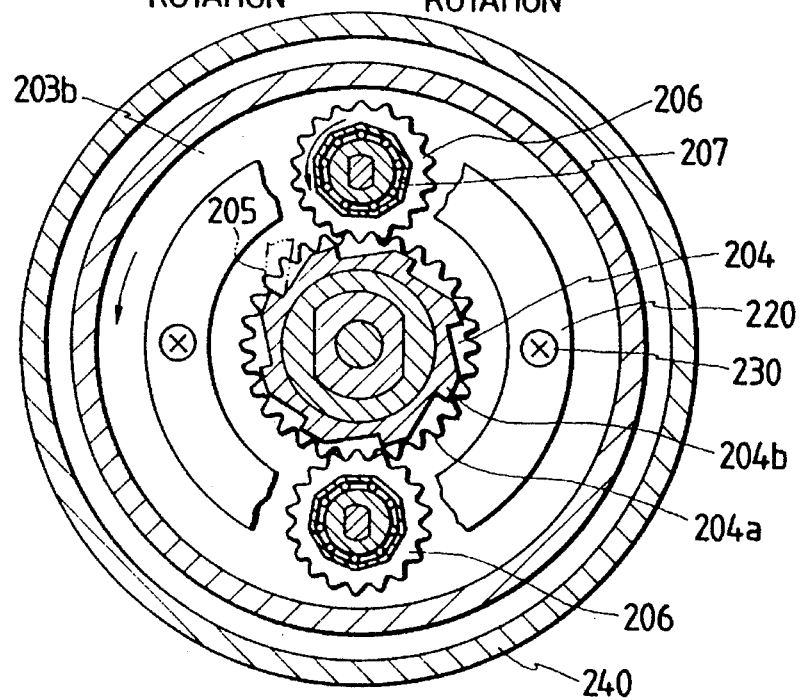
FIG. 26. is an enlarged sectional view of the reel along a line XXVI—XXVI shown in FIG. 25.

FIGS. 25 and 26 show a reverse rotation preventing mechanism which is the seventh embodiment and is in a spinning reel for fishing.

In this embodiment, each of clutch gears 206 which is fixedly secured to an outer peripheral surface of a roller-type one-way bearing 207 is pivotally supported to a bottom portion of a rotor 203b in parallel relation to a rotor quill 202. The clutch gears 206 are engaged with a gear portion 204a of a reverse rotation prevention member 204 which is rotatably supported to the rotor quill 202 through a collar 210. A reverse rotation prevention claw 205 can be engaged with one of the reverse rotation preventing engagement portions 204b which are provided to the member 204. The claw 205 is always urged by an urging means such as a spring member (not shown in the drawings) in such a direction as to engage the tip portion thereof with one of the engagement portions 204b when a fishline is wound on the spool. A clutch gear supporting member 220 is secured to the bottom portion 203b of the rotor 203 by a screw.

When a handle (not shown in the drawings) is turned in such a direction that the fishline is wound on the spool, the rotor 203 is rotated counterclockwise with regard to FIG. 26, and the clutch gears 206 pivotally supported to the bottom portion of the rotor 203b is rotated in kinematic conjunction with the rotor 203. At that time, since the pawl 205 is pressed to be engaged with one of engagement portions 204b of the reverse rotation preventing member 204 by the spring member, the member 204 is not rotated. In addition, clutch gears 206 are engaged with the gear 204a of the member 204 and the roller-type one-way bearing 207 can be rotated counterclockwise with regard to FIG. 26 so that the bearing 207 rotates on its axis and moves around a spool shaft 213. Therefore, the rotor 203 can be rotated when the fishline is wound on the spool.

When the fishline wound on the spool is then unwound therefrom by the pull of a fish, the rotor 203 is reversely rotated clockwise with regard to FIG. 26. At that time, the rotation of the clutch gears 206 in the clockwise direction is locked by the roller-type one-way bearing 207 so that the force for rotating the engagement portion 204b of the member 204 in the clockwise direction with regard to FIG. 26 is applied thereto. However, due to the engagement of the claw 205 with the member 204b, the reverse rotation preventing member 204 can not be reversely rotated any more. Therefore, the reverse rotation of the rotor 203 can be surely prevented.

Figure 27:
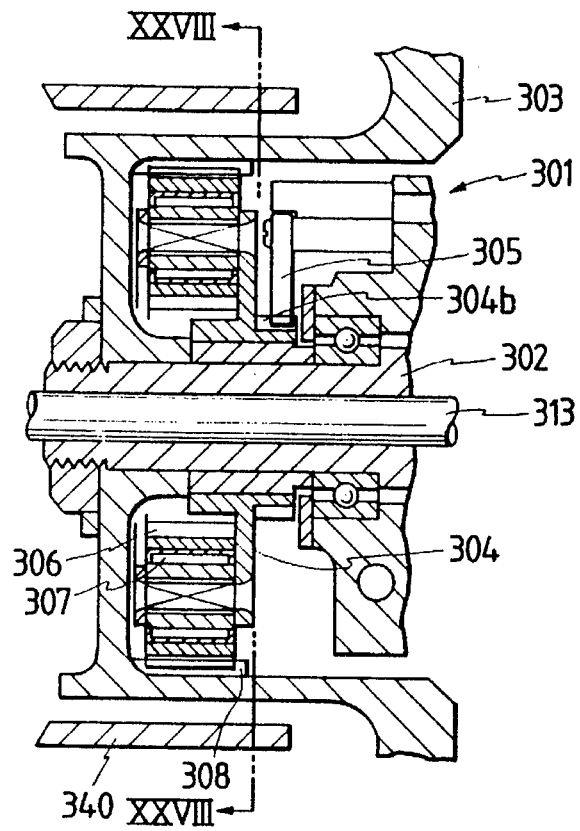
FIG. 27. is a partially sectional side view of a spinning reel which is for fishing and provided with a reverse rotation prevention mechanism which is a ninth embodiment of the present invention.
Figure 28:
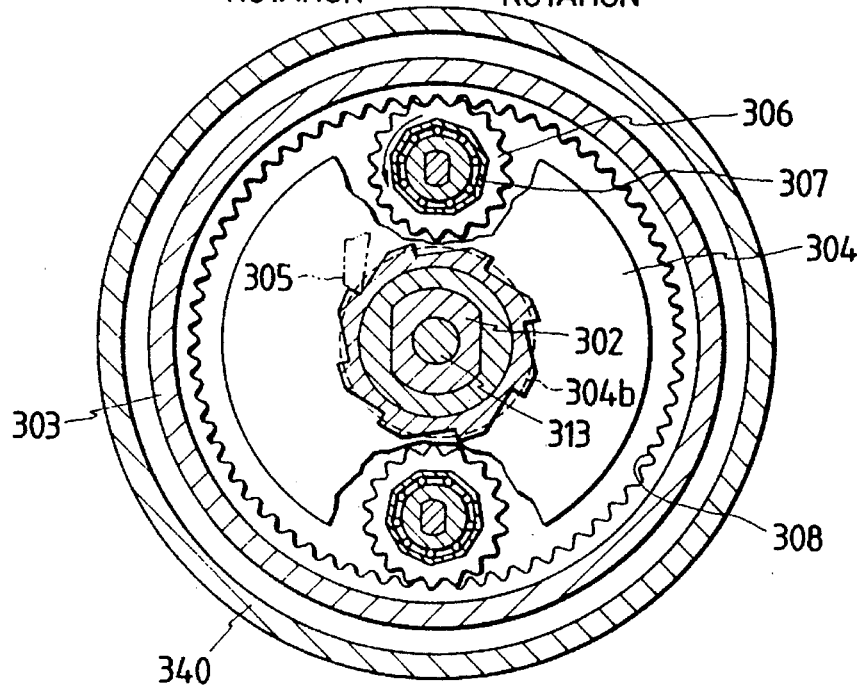
FIG. 28. is an enlarged sectional view of the reel along a line XXVIII—XXVIII shown in FIG. 27.

FIG. 27 and 28 show a reverse rotation preventing mechanism which is the eighth embodiment and is in a spinning reel for fishing.

In this embodiment, each of clutch gears 306 which is fixedly secured to an outer peripheral surface of a roller-type one-way bearing 307 is rotatably supported in a backward recess portion of the rotor 303 in parallel relation to a rotor quill 302. A reverse rotation prevention member 304 is rotatably supported on the rotor quill 302. Each of clutch gears 306 is engaged with the inner gear 308 provided to an inner peripheral surface of the rotor 303 and a reverse rotation preventing claw 305 is engaged with one of engagement portions 304b provided to the member 304.

When a handle (not shown) is turned in such a direction that the fishline is wound on the spool, the rotor 303 is rotated counterclockwise with regard to FIG. 27. At that time, clutch gears 306 engaged with the inner gear 308 rotate in its axis and the force for counterclockwise rotating the member 304 which supports clutch gears 306 around the spool shaft is applied to clutch gears 306. However, due to the engagement of the claw 305 with one of engagement portions 304b, the member 304 is not rotated. In addition, clutch gears 306 are engaged with the inner gear 308 provided to inner peripheral surface of the rotor 303 and the rotation of the bearing 307 in the counterclockwise direction is allowed so that each of clutch gears 306 rotates in its axis. Therefore, the rotor 303 can be rotated.

When the fishline wound on the spool is then unwound therefrom by the pull of a fish, the rotor 303 is reversely rotated clockwise with regard to FIG. 28. At that time, the rotation of each clutch gears 306 in the clockwise direction is locked by the roller-type one-way bearing 307 so that the force for rotating the engagement portion 304b of the member 304 which supports clutch gears 306 in the clockwise direction is applied thereto. However, due to the engagement of the claw 305 with one of the engagement portions 304b, the member 304 can not be reversely rotated. Therefore, the reverse rotation of the rotor 303 can be surely prevented.

Figure 29:
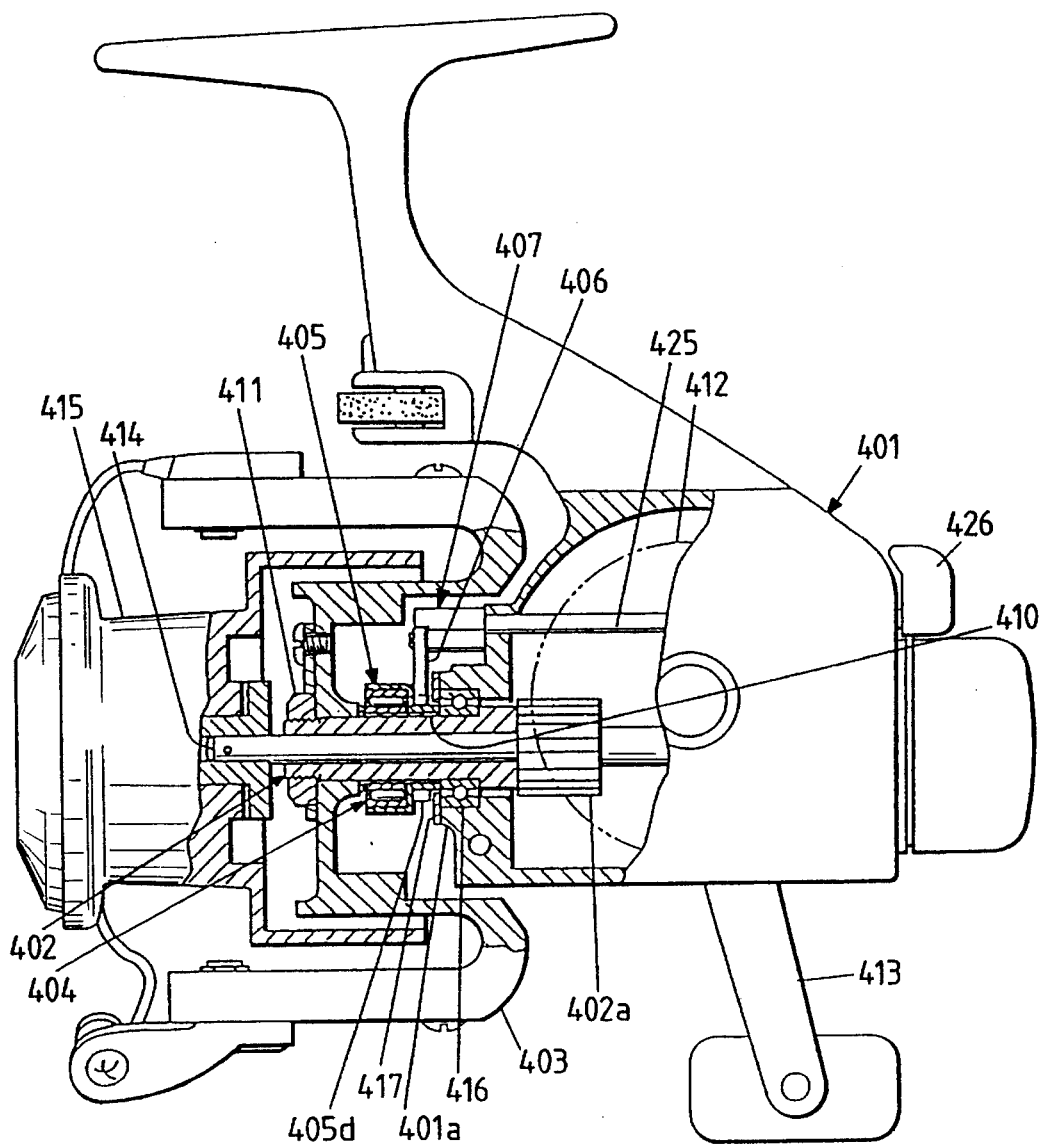
FIG. 29 is a sectional side view of a spinning reel for fishing to which a reverse rotation preventive mechanism according to a tenth embodiment of the present invention is applied.
Figure 30:
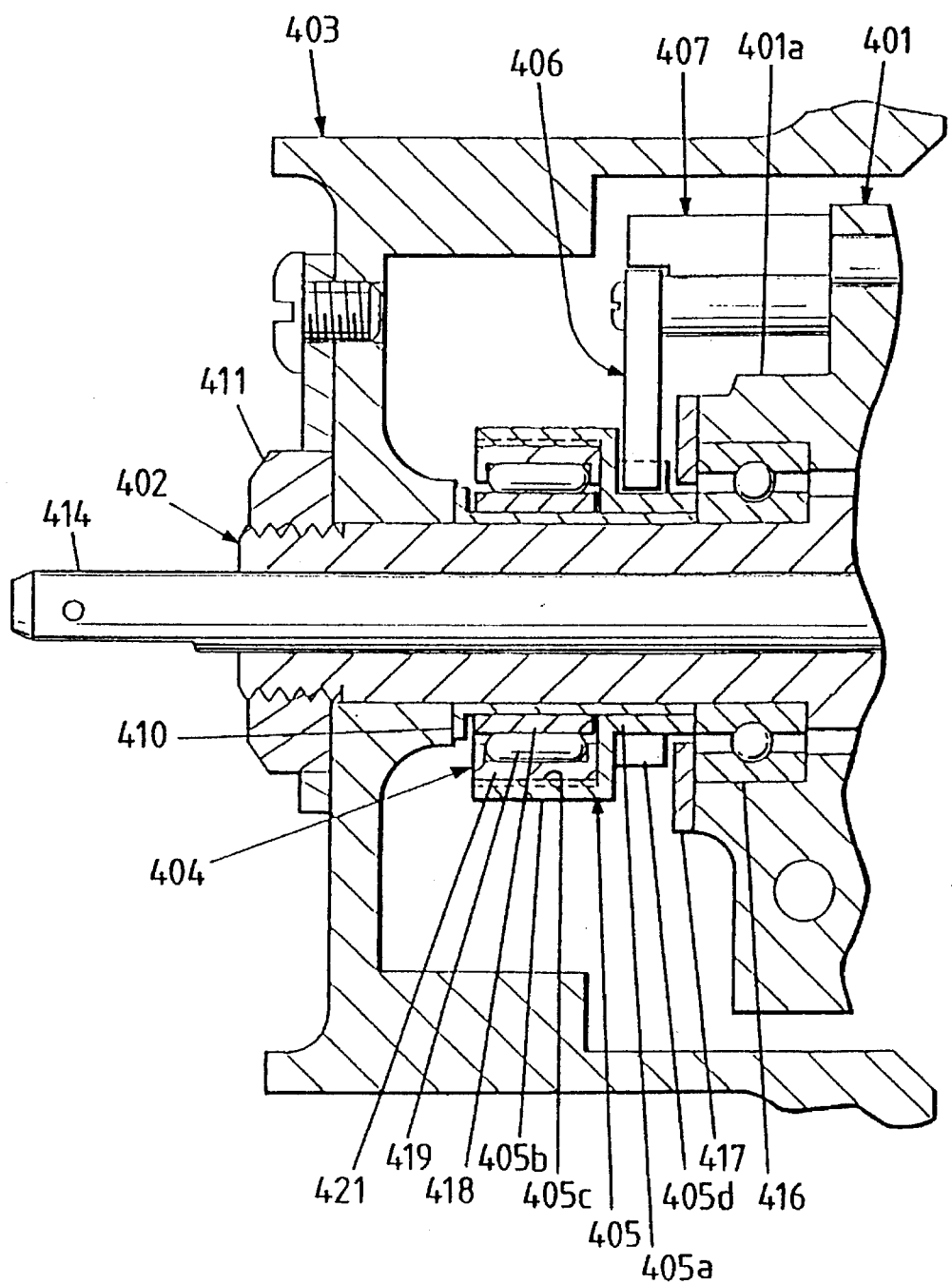
FIG. 30 is an enlarged sectional side view showing the reverse rotation preventive mechanism switched in a state where a reverse rotation of a rotor is prevented.
Figure 31:
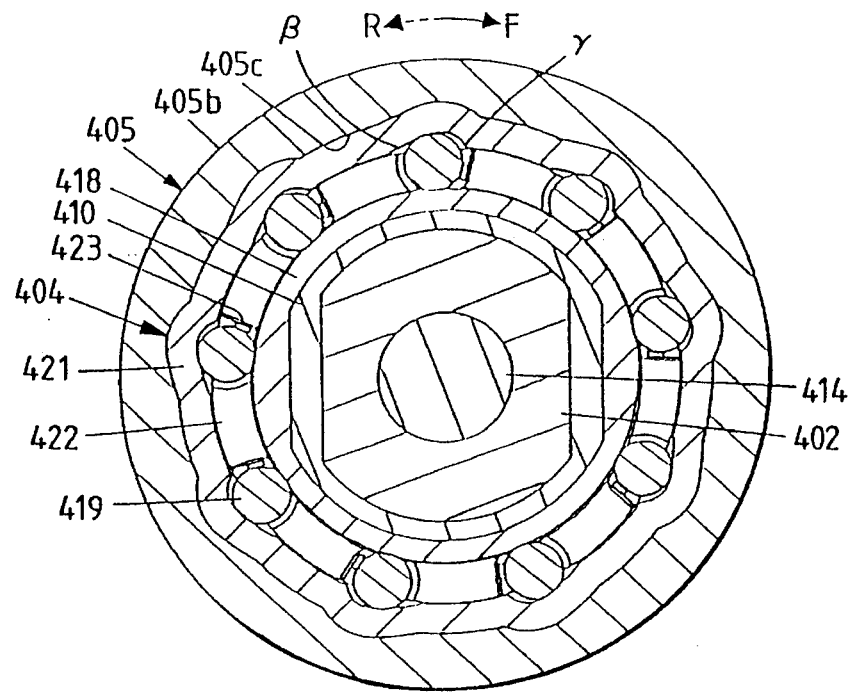
FIG. 31 is a sectional front view showing a rolling type one-way clutch employed in the reverse rotation preventive mechanism.
Figure 32:
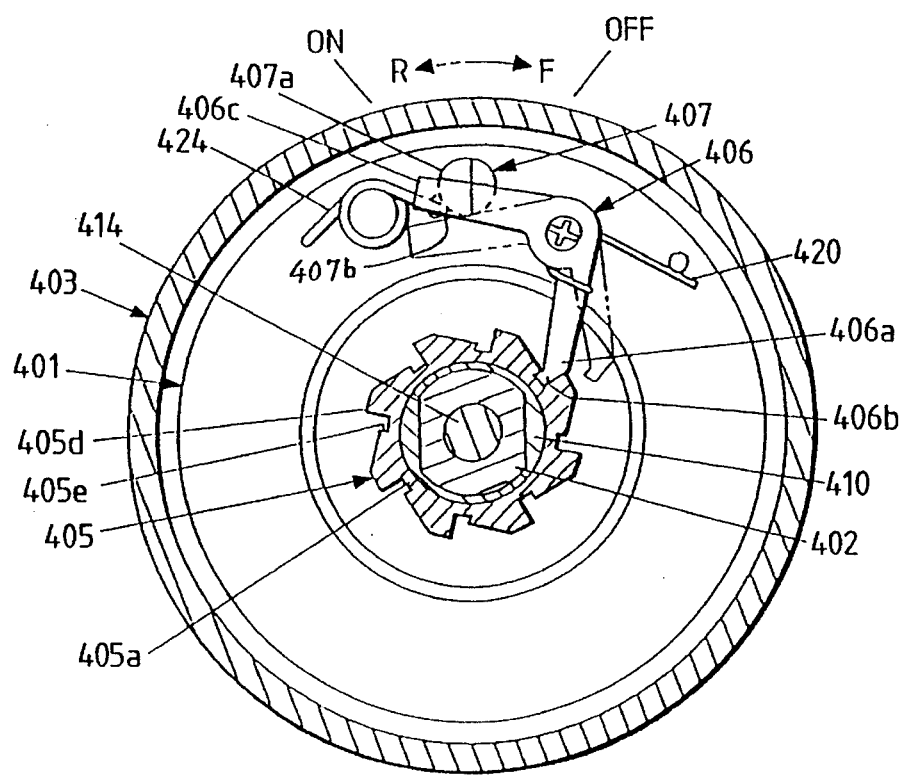
FIG. 32 is a sectional front view showing main portions of a reel main body.

FIGS. 29 to 32 show a tenth embodiment of the present invention. FIG. 29 is a sectional side view of a spinning reel for fishing to which a reverse rotation preventive mechanism according to a tenth embodiment of the present invention is applied. FIG. 30 is an enlarged sectional side view showing the reverse rotation preventive mechanism switched in a state where a reverse rotation of a rotor is prevented. FIG. 31 is a sectional front view showing a rolling type one-way clutch employed in the reverse rotation preventive mechanism. FIG. 32 is a sectional front view showing main portions of a reel main body.

In the spinning reel for fishing shown in FIGS. 29 and 30, a collar 410 having a flange is non-rotatably fitted on an outer periphery of a rotary quill 402 projected from a front cylindrical portion 401a of a reel main body 401. A rotor 403 is non-rotatably fitted on a portion of the outer periphery of the rotary quill 402 located forwardly of the collar 410, and fixed in place by a nut 411. A bearing 416 is installed inside the cylindrical portion 401a of the reel main body 401, and a stop plate 417 attached on an end of cylindrical portion 401a prevents the removal of the bearing 416 out of place.

An inner race member 418 of a rolling type one-way clutch 404 is non-rotatably fitted on the outer periphery of the flanged collar 410. A plurality of rolling elements 419 are disposed on the outer periphery of the inner race member 418. A cylindrical adjoining portion 405a of an outer frame member 405 is rotatably fitted on the outer periphery of the flanged collar 410, and a large diameter portion 405b of the outer frame member 405 is formed with a recess 405c in which the rolling-type one-way clutch 404 is installed. The outer periphery of the adjoining portion 405a is formed into an engagement portion 405d to provide a reverse rotation preventive ratchet wheel. A reverse rotation preventive claw 406 is swingably provided on the reel main body 401 and confronted with the engagement portion 405d so as to engage with and disengage from the engagement portion 405d. The reverse rotation preventive claw 406 is biased by a spring 420 so as to engage with the engagement portion 405d.

The rolling type one-way clutch 404 is made up of the inner race member 418, the rolling elements 419, an outer race member 421, a retainer 422 made from synthetic resin, and springs 423. The rod-like rolling elements 419 are respectively installed in a plurality of through-holes defined by the retainer 422, and biased by springs 423. The outer race member 421 defines, on the inner periphery thereof, a free rotation region α for permitting rotation of each needle rolling element 419 and a rotation hindrance region where the rotation of each needle rolling element 419 is hindered when it is contacted with the rotation hindrance surface β.

A notch 405e is formed in the engagement portion 405d of the outer frame member 405, and a protrusion 406b is formed on a claw end 406a of the engagement claw 406. The protrusion 406b is adapted to be fitted into the notch 405e. The notch 405e, the protrusion 406b and the spring 420 cooperatively constitute a positive engagement means for preventing the disengagement of the claw end 406a of the engagement claw 406 from the engagement portion 405d.

An operation portion 406c is formed on an opposite side of the engagement claw 406. The operation portion is controlled by a cam 407a formed on a cam portion 407 to permit the claw end 406a to engage with the engagement portion 405d or to prevent the claw end 406a from engaging with the engagement portion 405d. A torsion spring 424 is suspended between the reel main body 401 and a spring retaining portion 407b of the cam portion 407. The cam portion 407 is fixed on a leading end of an operation rod 425, and a knob 426 is fixed on an opposite end of the operation rod 425 projecting backwardly from the reel main body 421. FIG. 32 shows a state where the knob 426 is switched to the "ON" position so that the engagement protrusion 406b of the engagement claw 406 can be engaged with the notch 405e of the engagement portion 405d.

The reverse rotation preventive operation for the spinning reel is described hereunder.

When the handle 413 is rotated in a direction to wind a fishline (not shown) onto the spool 415 under an engagement condition where the knob 426 is switched to the "ON" position so that the engagement protrusion 406b of the engagement claw 406 is engaged with the notch 405e of the engagement portion 405d as shown in FIGS. 29 to 32, the rotary quill 402, the rotor 403, flanged collar 410 and the inner race member 418 of the rolling-type one-way clutch 404 are all rotated forwardly, i.e. in a clockwise direction in FIGS. 31 and 32.

If the inner race member 418 is rotated in the clockwise direction, each of the rolling elements 419 of the one-way clutch 404 is positioned in the free rotation region α defined by the outer race member 421, so that the rotor 403 can be rotated in the clockwise direction. In this case, the outer frame 405 is not rotated since the engagement protrusion 406b of the engagement claw 406 is engaged with the notch 405e of the engagement portion 405d.

Thereafter, if the fishline wound on the spool 415 is supplied therefrom due to a pulling force of the fish, the rotor attempts to rotate reversely, i.e. in a counterclockwise direction in FIG. 32. Simultaneously with the attempt reverse rotation of the rotor 403, the rotary quill 402, the flanged collar 410 and the inner race member 418 are slightly rotated reversely so that each of the rolling member 419 is moved from the free rotation region α to the rotation hindrance region to be brought into contact with the rotation hindrance surface β, whereby the reverse rotation of the inner race member 418 relative to the outer race member 421 is immediately stopped by the wedge action of each of the rolling members 419. Thus, the reverse rotation of the rotor 403 can be stopped.

In a case where the knob 426 is switched to the "OFF" position so that the engagement claw 406 is driven by the cam 407a of the cam portion 407a against the biasing force of the spring 420 as indicated by a two-dotted chain line in FIG. 32, the rotor 403 can be freely rotated in both forward and reverse directions.

When the knob 426 is switched from the "OFF" position to the "ON" position and further the rotor 403 is rotated in the reverse direction, the rolling type one-way clutch 404 is first activated so that the outer frame 425 is rotated in the reverse direction, and then the claw end 406a of the engagement claw 406 is engaged with the engagement portion 425b. This engagement causes an impact load, but the impact load is received by the adjoining portion 425a, the flanged collar 410 and the rotary quill 402 since the engagement portion 405d of the outer frame 405 is formed on the adjoining portion 405a fitted on the outer periphery of the flanged collar 410.

If the engagement portion for engagement with the engagement claw is formed on the outer periphery of the outer race member or a rachet wheel having such engagement portion is fitted on the outer periphery of the outer race member as in a construction disclosed by U.S. Pat. No 5,020,738, the above-mentioned impact load, which generally acts in a radial direction on a member receiving the load or in a direction to distort the member, adversely affects on the alignment between the outer race member and the inner race member or damages the surface of the outer race member defining the free rotation region and the rotation hindrance region, so that the stable wedge action achieved by the high precise structure can not be maintained for a long time period of use.

However, in the present invention, since the engagement portion 405d of the outer frame 405 is formed on the adjoining portion 405a which is fittingly supported on the outer periphery of the flanged collar 410 and is longitudinally arranged in series with respect to the outer and inner race members 421 and 418, the impact load caused at the time the claw end 406a of the engagement claw 406 is engaged with the engagement portion 405d of the outer frame 405 during when the rotor 403 is rotated reversely is received by the adjoining portion 405a, the flanged collar 410 and the rotary quill 402 and does not adversely affect on the rolling type one-way clutch 404. Thus, the dimensional precision of portions where the rolling members 419 perform the wedge action can be maintained for a long time use.

Accordingly, in the fishing reel thus constructed, the reverse rotation can be stopped by a simple structure with little idle rotation, and the proper reversal preventive function employing the wedge action can be surely maintained for a long time use. Further, since the engagement portion 405d for engagement with the engagement claw 406 is formed on the adjoining portion 405a, the radial dimension of the reversal preventive mechanism can be reduced, to enable the installation of the reversal preventive mechanism into a fishing reel having a relatively small space around the rotary quill.

In addition, the notch 405e formed in the engagement portion 405d of the outer frame member 405 and the engagement protrusion 406a of the engagement claw 406 may be omitted.

Figure 33:
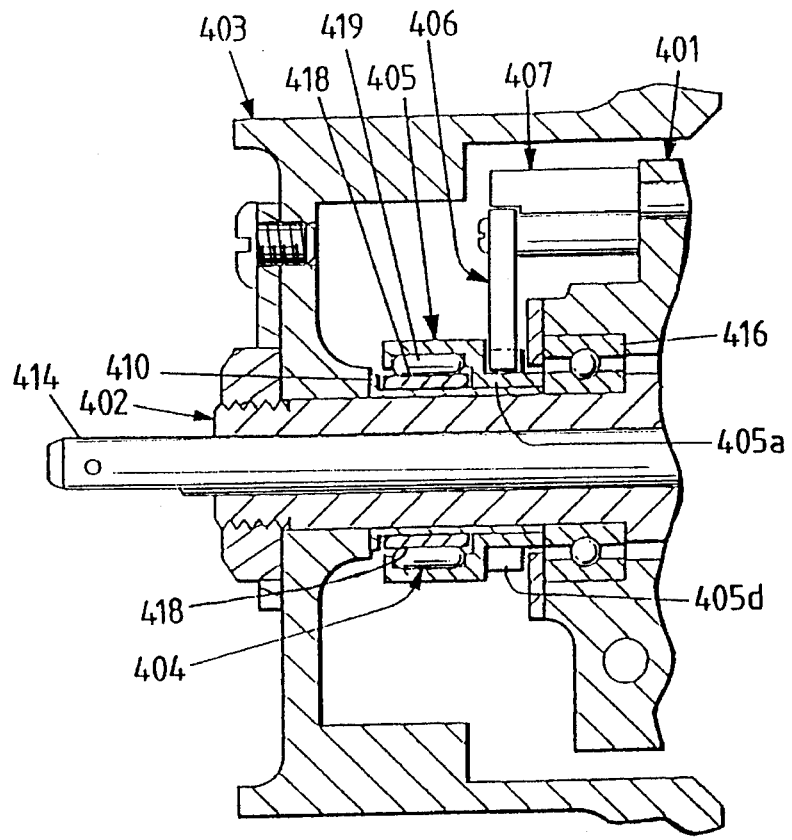
FIG. 33 shows a modification of the tenth embodiment, and is an enlarged sectional side view showing main portions of a spinning reel for fishing in a state that the reverse rotation of a rotor can be stopped.

FIG. 33 shows a modification of the tenth embodiment, and is an enlarged sectional side view showing main portions of a spinning reel for fishing in a state that the reverse rotation of a rotor can be stopped.

In the modification shown in FIG. 33, the outer race member of the rolling type one-way clutch 404 is omitted, and the free rotation region α and the reverse rotation hindrance surface β similar to those shown in FIG. 32 are formed on the inner periphery of the outer frame member 405 for the rod-like rolling members 419. Other construction is the same as that of the tenth embodiment.

Figure 34:
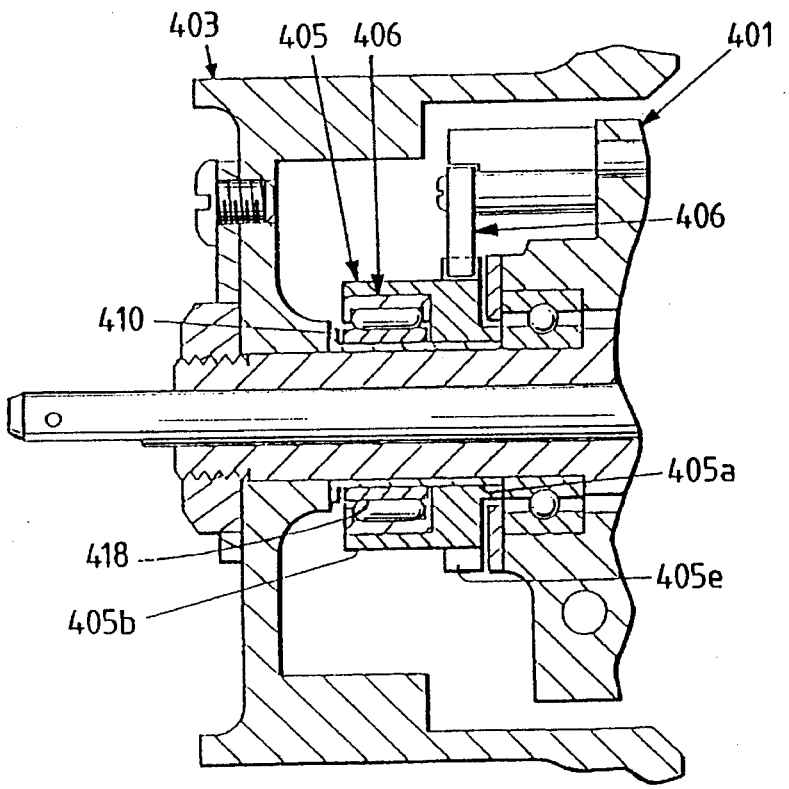
FIG. 34 shows another modification of the tenth embodiment, and is an enlarged sectional side view showing main portions of a spinning reel for fishing in a state that the reverse rotation of the rotor can be stopped.

FIG. 34 shows another modification of the tenth embodiment, and is an enlarged sectional side view showing main portions of a spinning reel for fishing in a state that the reverse rotation of the rotor can be stopped.

In the modification shown in FIG. 34, the adjoining portion 405a is so formed that the outer diameter thereof is substantially the same as that of the large diameter portion 405b of the outer frame 405. Further, the engagement portion 405e is formed on the outer periphery of the larger diameter adjoining portion 405a. Other construction is the same as that of the tenth embodiment.

Figure 35:
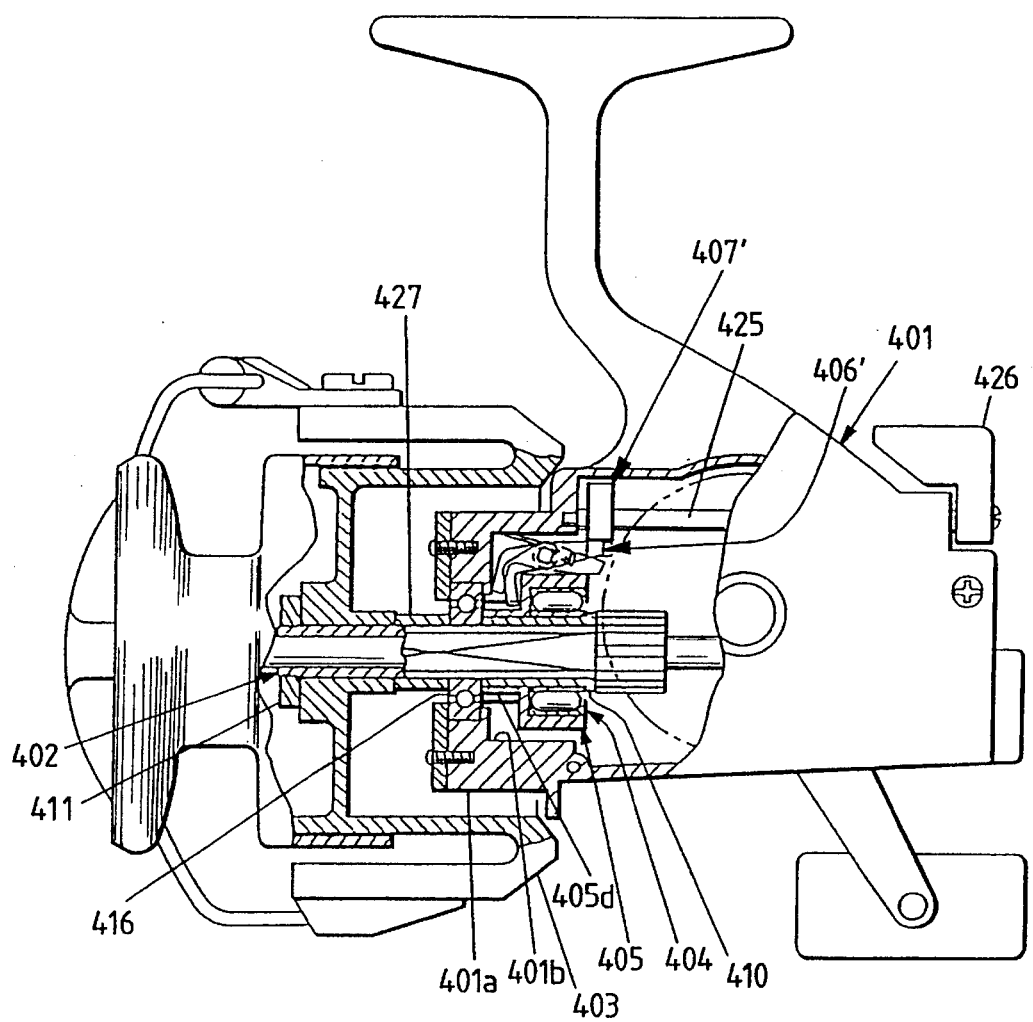
FIG. 35 is a sectional side view showing a spinning reel for fishing employing a reverse rotation preventive mechanism according to the eleventh embodiment of the present invention.
Figure 36:
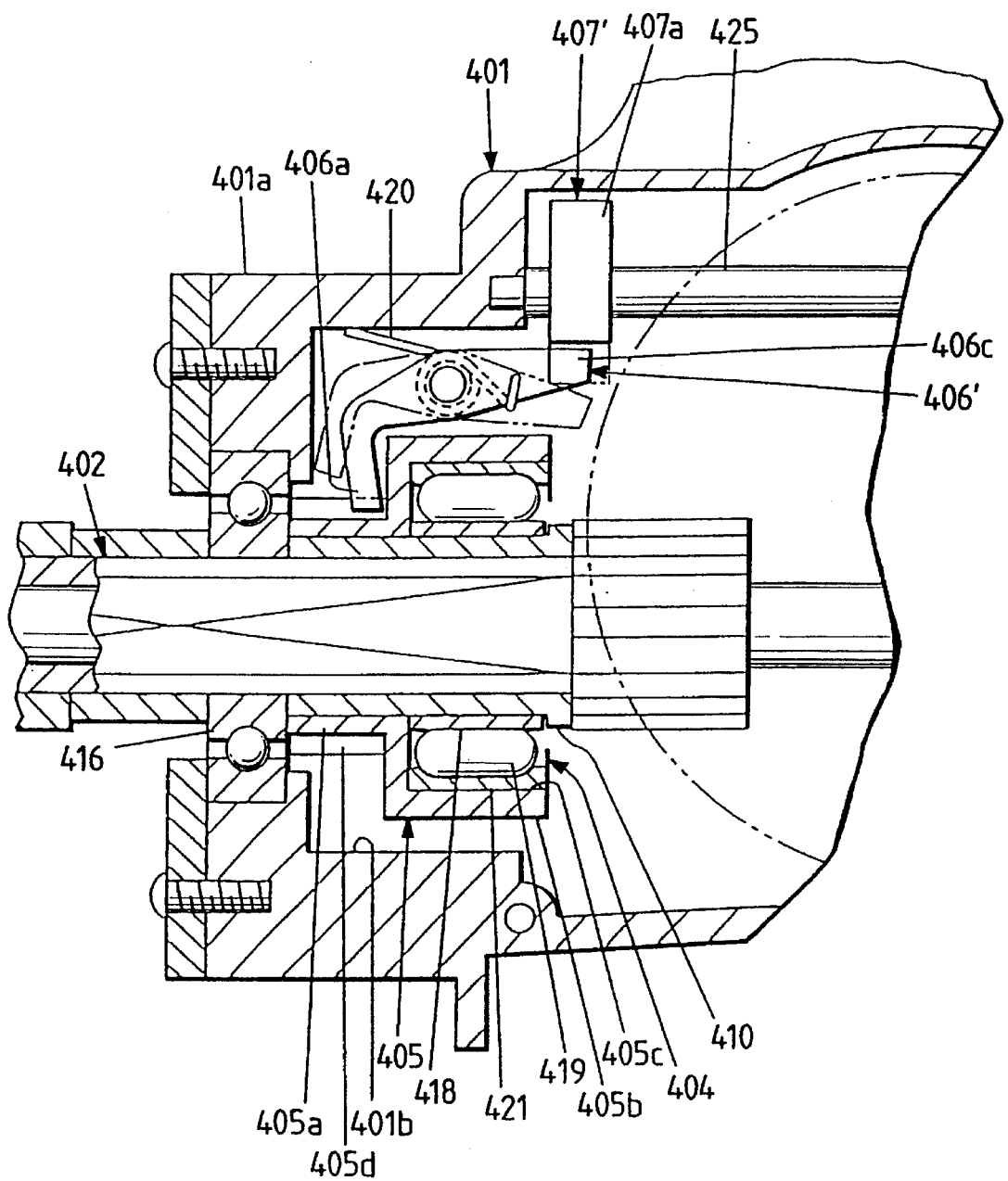
FIG. 36 is an enlarged sectional side view showing main portions of the eleventh embodiment.

FIGS. 35 and 36 show an eleventh embodiment of the present invention. FIG. 35 is a sectional side view showing a spinning reel for fishing employing a reverse rotation preventive mechanism according to the eleventh embodiment of the present invention, and FIG. 36 is an enlarged sectional side view showing main portions of thereof.

In the spinning reel shown in FIGS. 35 and 36, a recess portion 401b is provided inside a front cylindrical portion 401a of a reel main body 401, and a flanged collar 410 is non-rotatably fitted on a portion of an outer periphery of a rotary quill 402, which is located within the recess portion 401b. A collar 427 is fitted on another portion of the outer periphery of the rotary quill 402, which is located forwardly of a bearing 416 provided within the cylindrical portion 401a of the reel main body 401. The rotor 403 is also non-rotatably fitted on the outer periphery of the rotary quill 402, and fixed in place by a nut 411. On the outer periphery of the flanged collar 410, there is non-rotatably fitted an inner race member 418 of a rolling-type one-way clutch 404 of the same type as that of the tenth embodiment. A plurality of rod-like or bar-like rolling elements 419 are rotatably disposed on the outer periphery of the inner race member 418. A cylindrical outer frame 405 of the same type as that of the ninth embodiment is provided on the flanged collar 410 such that adjoining portion 405a is rotatably fitted on the outer periphery of the flanged collar 410. The large diameter portion 405b of the outer frame 405 is formed with a recess 405c receiving the rolling-type one-way clutch 404. An engagement portion 405d is formed on the outer periphery of the adjoining portion 405a to provide rachet teeth for reversal prevention. A reversal preventive engagement claw 406' is swingably provided on the reel main body 401, and an claw end 406a of the engagement claw 406' is confronted with the engagement portion 405d so as to be engaged with and disengaged from the engagement portion 405d. A spring 420 is provided to bias the engagement claw 406 in a direction to be engaged with the engagement portion 405d.

An operation portion 406c is formed on the engagement claw 406 opposite from the claw end 406a, and controlled by a cam 407a of a cam portion 407' so that the claw end 406a can be engaged with the engagement portion 405d or the claw end 406a never be engaged with the engagement portion 405d. A torsion spring (not-shown) is suspended between the reel main body 401 and a spring hook (not shown) provided on the cam portion 407'.

The cam portion 407' is fixed on a front end of an operation rod 425, and a knob 426 is fixed on a rear end of the operation rod 425 which projects from the reel main body rearwardly. When the knob 426 is switched to the "ON" position, the engagement claw 406' is moved as indicated by a solid line in FIG. 36 so that the claw end 406a of the engagement claw 406' is engaged with the engagement portion 405d of the outer frame 405. When the knob 426 is switched to the "OFF" position, the engagement claw 406 is moved as indicated by a two-dotted chain line in FIG. 36 so that the claw end 406a of the engagement claw 406' is kept disengaged from the engagement portion 405d of the outer frame 405.

The reverse rotation preventive operation of the eleventh embodiment is substantially the same as that of the tenth embodiment.

Figure 37:
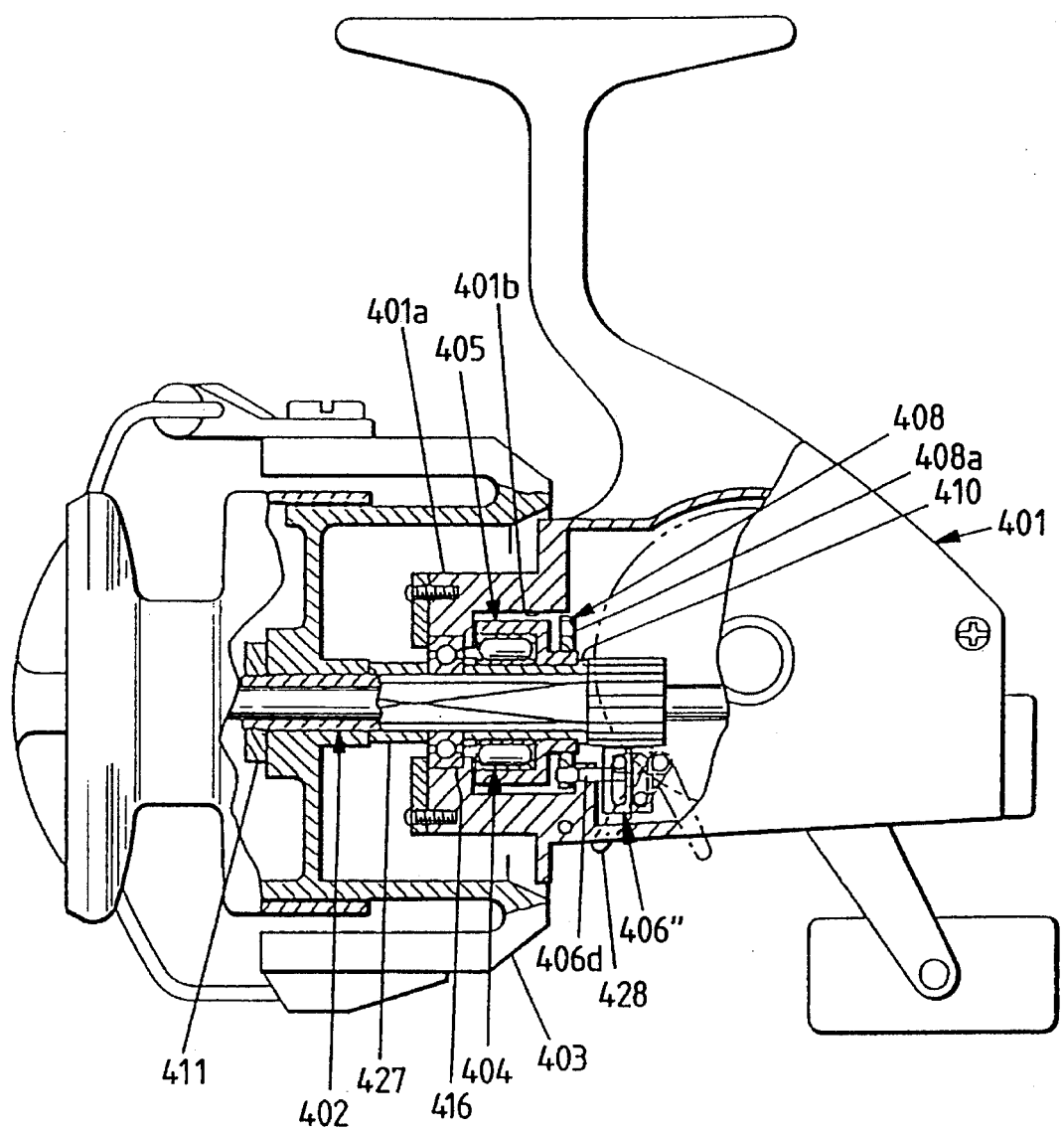
FIG. 37 is a sectional side view showing a spinning reel for fishing employing a reverse rotation preventive mechanism according to a twelfth embodiment of the present invention.
Figure 38:
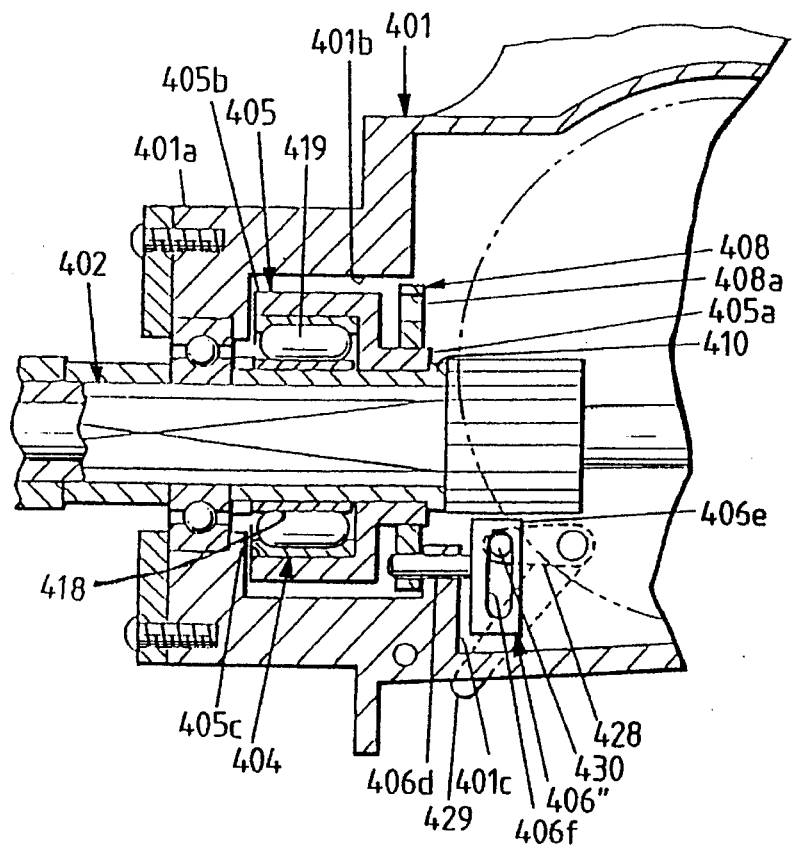
FIG. 38 is an enlarged sectional side view of main portions of the reel in a state that the reverse rotation of a rotor can be stopped.
Figure 39:
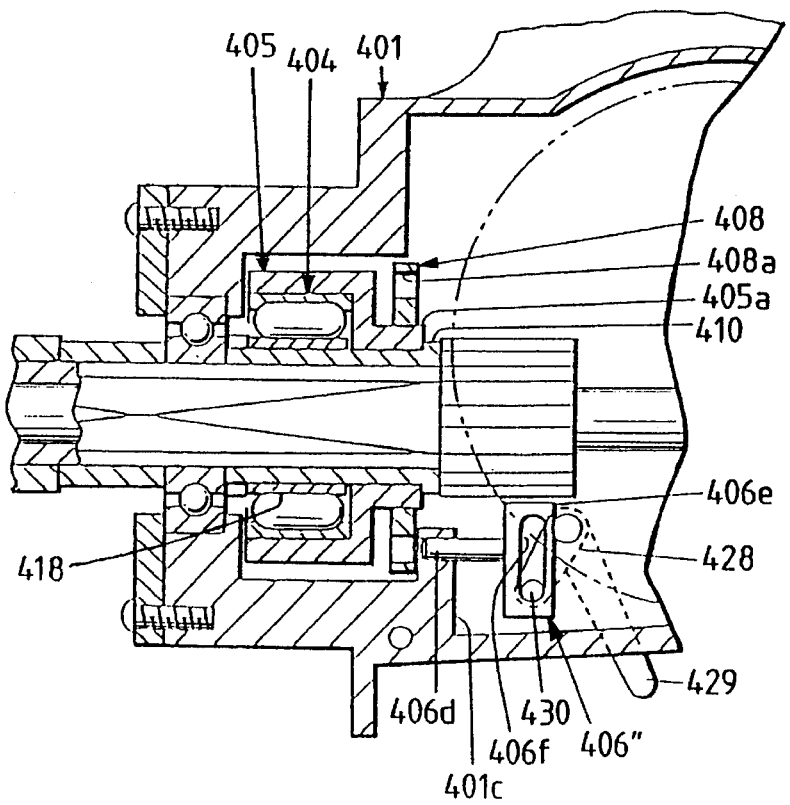
FIG. 39 is an enlarged sectional side view showing the main portions of the reel in a state that the rotor can be rotated both forwardly and reversely.

FIGS. 37 to 39 show a twelfth embodiment of the present invention. FIG. 37 is a sectional side view showing a spinning reel for fishing employing a reverse rotation preventive mechanism according to the twelfth embodiment of the present invention, FIG. 38 is an enlarged sectional side view of main portions of the reel in a state that the reverse rotation of a rotor can be stopped, and FIG. 39 is an enlarged sectional side view showing the main portions of the reel in a state that the rotor can be rotated both forwardly and reversely.

In the twelfth embodiment shown in FIGS. 37 to 39, as similarly to the eleventh embodiment, a recess 401b is formed inside a front cylindrical portion 401a of a reel main body 401. A flanged collar 410 is non-rotatably fitted on a portion of an outer periphery of a rotary quill 402, which is located within the recess 401b. A collar 427 is fitted on another portion of the outer periphery of the rotary quill 402, which is located forwardly of a bearing 416 provided inside the cylindrical portion 410a of the reel main body 401. A rotor 403 is non-rotatably fitted on the outer periphery of the rotary quill 402 and fixed in place by a nut 411. On the outer periphery of the flanged collar 410, there is non-rotatably fitted an inner race member 418 of a rolling-type one-way clutch 404 which is of the same type as that of the tenth embodiment. A plurality of bar-like rolling members 419 are rotatably disposed on the outer periphery of the inner race member 418. Further, on the outer periphery of the flanged collar 410, there is rotatably fitted a cylindrical adjoining portion 405a of a outer race member 405 which is of the same type as that of the tenth embodiment. The outer race member 405 is formed with a large diameter portion 405b having a recess 405c for receiving the rolling-type one-way clutch 404.

A reversal preventive circular plate 408 is fixed on the outer periphery of the adjoining portion 405a. A plurality of holes are formed in the circular plate 408 so as to constitute an engagement portion 408a. A pin 406d of an engagement member 406" is confronted with the engagement portion 408a so as to be engaged with and disengaged from the engagement portion 408a.

The engagement member 406" is made up of the pin 406d, a main body 406e and a vertically elongated hole 406f formed in the main body 406e. The pin 406d is slidably fitted in a hole of a receiving portion 401c of the reel main body 401. A lever 428 is rotatably provided on the reel main body 401 rearwardly of the engagement member 406". The lever 428 can be rotatably driven through a knob handle 429. A click mechanism (not shown) is provided for the knob handle 429. A pin 430 is fixed on the lever 428 and received by the elongated hole 406f of the engagement member 406".

The reversal preventive operation achieved by the twelfth embodiment is described hereunder.

If the pin 406d of the engagement member 406" is inserted and retained in the engagement portion 408a of the circular plate 408 fixed on the outer periphery of the adjoining portion 405a of the outer frame 405 as shown in FIG. 38, the rotation of the outer frame 405 is hindered, and therefore the reverse rotation of the rotor 403 can be stopped.

On the other hand, if the lever 428 is rotated by rotating the handle knob 129 as shown in FIG. 39, the pin 406d of the engagement member 406" is disengaged from the engagement portion 408a of the circular plate 408 fixed on the outer frame 405, so that the rotor 403 can be rotated both forwardly and reversely.

The same advantages as those of the tenth embodiment can also be obtained by this embodiment.

Figure 40:
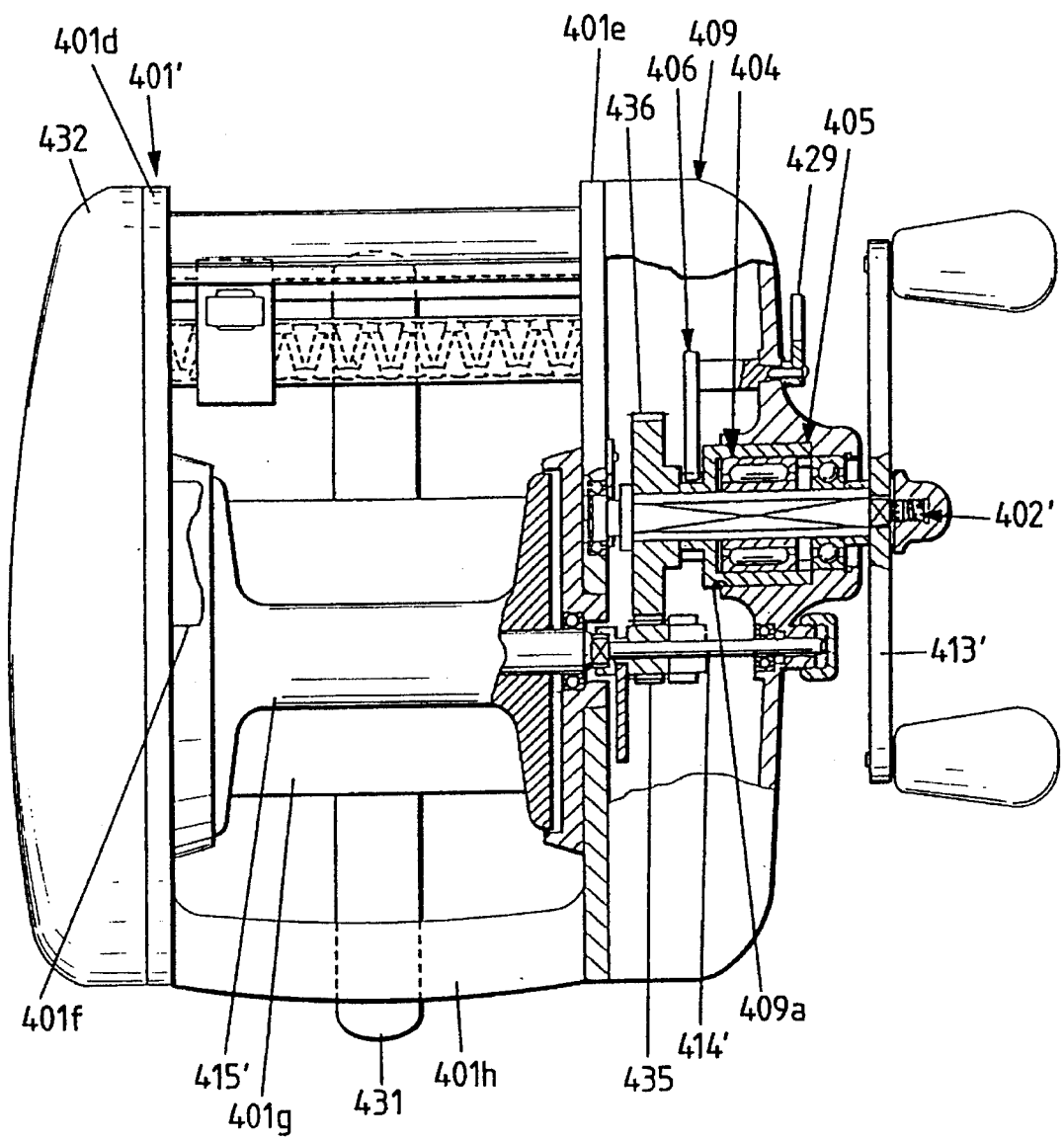
FIG. 40 is a sectional plane view showing a double bearing type fishing reel employing a reverse rotation preventive mechanism according to the thirteenth embodiment of the present invention.
Figure 41:
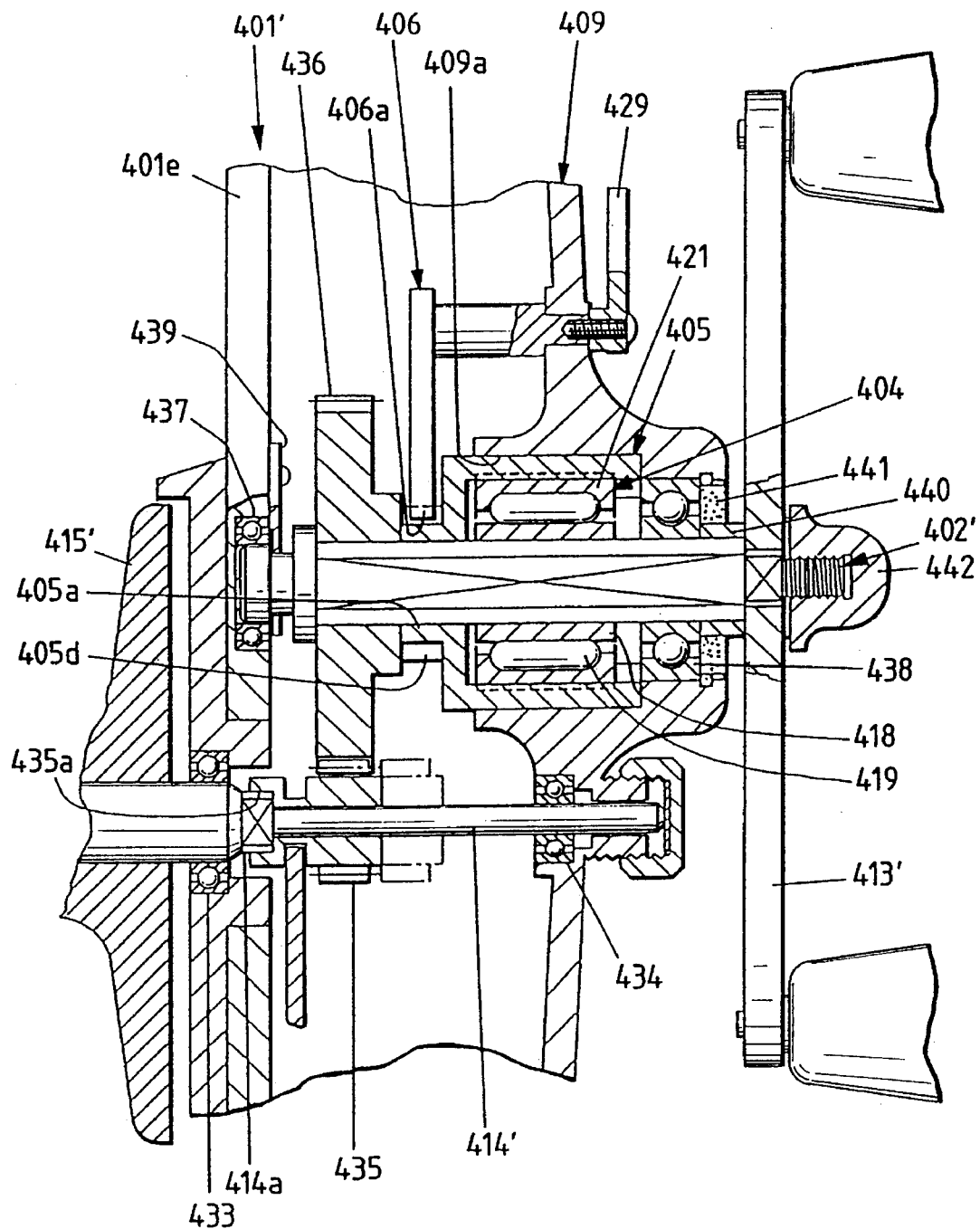
FIG. 41 is an enlarged sectional plane view showing main portions of the double bearing type fishing reel in a state that a drive shaft is prevented from being rotated reversely.

FIGS. 40 and 41 show a thirteenth embodiment of the present invention. FIG. 40 is a sectional plane view showing a double bearing type fishing reel employing a reverse rotation preventive mechanism according to the thirteenth embodiment of the present invention. FIG. 41 is an enlarged sectional plane view showing main portions of the double bearing type fishing reel in a state that a drive shaft is prevented from being rotated reversely.

In the double bearing type fishing reel shown in FIGS. 40 and 41, a reel main body 401' is constructed by right and left side frames 401e and 401c, a support column 401f, a fixing plate 401g for a reel leg 431, and a thumb rest 401h which are all integral formed together so that the right and left side frames 401c and 401e are held parallel relation therebetween. The reel main body 401' further includes right and left side plates 409 and 432 respectively fixed onto the outer sides of the right and left side frame 401e and 401c so as to constitute side portions of the reel main body 401'. A spool 415' is rotatably supported between the side frames 401c and 401e in such a manner that a spool shaft 414' fixed to the spool 415' is rotatably supported at one end thereof by a not-shown bearing and at the other end thereof by bearings 433 and 434. A pinion 435 is axially slidably fitted on the spool shaft 414' so that an engagement portion 435a of the pinion 435 can be engaged with and disengaged from an engagement portion 414a of the spool shaft 414. The pinion 435 is meshed with a drive gear 436 non-rotatably fitted on a drive shaft 202'.

The drive shaft 402' is axially supported by a bearing 437 provided on the right side frame 401e and a bearing 438 installed in the reel side plate 409, and an axial displacement of the drive shaft 402' is restricted by a stop plate 439 provided in the vicinity of one end of the drive shaft 402' where the bearing 437 is provided. A recess 409a is provided in the reel side plate 409 inwardly of the bearing 438, and an outer frame 405 of the same type as that of each of tenth to twelfth embodiments is fitted on the outer periphery of the drive shaft 402' within the recess 409'. An inner race member 418 of a rolling-type one-way clutch 404 is non-rotatably fitted on the outer periphery of the drive shaft 402' within the recess 409'. A claw end 406a of the reversal preventive engagement claw 406 is swingably provided on the reel side plate 409 of the reel main body 401' and biased by a not-shown spring in a direction to engage with an engagement portion 405d of the outer frame 405. The engagement claw 406 can be rotated through a knob handle 429. A click mechanism (not-shown) is provided for the knob handle 429. A felt 441 is attached to an outer periphery of a collar 440 disposed outwardly of the bearing 438. A handle 413' is mounted onto the other end of the drive shaft 402' by means of a nut 442.

The reversal preventive operation achieved by the above-mentioned double bearing type fishing reel is described hereunder.

When the handle 413' is rotated in a direction to wind a fishline (not-shown) on to the spool 415' under a state that the claw end 406a of the engagement claw 406 is engaged with the engagement portion 405d of the outer frame 405, the drive shaft 402' the inner race member 418, drive gear 436, the pinion 435, the spool shaft 414' and the spool 415' are forwardly rotated. This forward rotation of the inner race member 418 positions each of the rolling members 419 of the rolling-type one-way clutch 404 into the free rotation region of the outer race member 421 as similarly to the tenth embodiment shown in FIG. 31, so as to permit the further rotation of the spool 415'.

If the fishline wound on the spool 415' is supplied therefrom due to the pulling force of the fish or the like, the spool 415' is rotated reversely, and thus the inner race member 418 is rotated reversely, i.e. in a counterclockwise direction in FIG. 31. This reverse rotation of the inner race member 418 positions each of the rolling members 419 of the one-way clutch 404 from the free rotation region α to the rotation hindrance region so that each of the rolling members 419 are brought into contact with the rotation hindrance surface β. Thus, the rolling member 419 provides the wedge action, to thereby stop the reverse rotation of the inner race member 418 relative to the outer race member 421. Accordingly, the reverse rotation of the spool 415' can be stopped.

When the handle knob 429 is rotated so that the claw end 406a of the engagement claw 406 is disengaged from the engagement portion 405d of the outer frame 405, all of the inner race member 418, the drive shaft 402' the drive gear 436, the pinion 435, the spool shaft 414' and the spool 415' can be rotated both forwardly and reversely. The spool 415' can also be rotated both forwardly and reversely in a case that the engagement portion 435a of the pinion 435 is disengaged from the engagement portion 414a of the spool shaft 414'.

Thereafter, if the knob handle 429 is rotated and returned so that the claw end 406a of the engagement claw 406 can be engaged with the engagement portion 405d of the outer frame 405, and simultaneously the fishline wound onto the spool 415' is supplied therefrom, then the spool 415' is rotated reversely. This reverse rotation of the spool 415' causes the reverse rotation (i.e. the counterclockwise rotation in FIG. 31) of the inner race member 418.

When the inner race member 418 is rotated reversely, the rolling-type one-way clutch is first activated and then the claw end 406a of the engagement claw 406 is engaged with the engagement portion 405d of the outer frame 405. At this time, the impact load is produced, but it is received by the adjoining portion 405a and the drive shaft 402 since the engagement portion 405d of the outer frame 405 is formed on the outer periphery of the adjoining portion 405a longitudinally spaced from the outer race member 405.

In each of the embodiments described above, it is possible that the rolling-type one-way clutch is dispensed with the inner race member 418. That is to say, the rolling elements 419 can be directly disposed on the collar 410. Further, the present invention is described along the embodiments of the spinning type fishing reel and the double bearing type fishing reel, but the present invention can be applied to other type fishing reels including a single bearing type and so on.

In a reverse rotation preventing mechanism provided in accordance with the present device, in a spinning reel for fishing, since the roller-type one-way clutches are provided between the rotor and the reverse rotation prevention member, the engagement surfaces of the components of the mechanism are not to be locally loaded. Therefore, the durability of the engagement surfaces in the reverse rotation of the rotor can be enhanced and the high precision can be maintained in a long period. Besides, since the prevention member are provided to the reverse rotation prevention claw and a member corresponding to the claw, and the claw remains engaged with the ratchet without a clearance between them, the rotor is surely and instantaneously prevented from rotating reversely.

In addition, in the present invention, since the clutch member is provided within the limited space, that is, the space between the rotor and the reverse rotation prevention member, so as to utilize usefully there, the mechanism can be appropriate to a compact reel.

Further, according to the present invention, the weight of the construction becomes to be light and the manufacture cost can be reduced.

What is claimed is:

1. A reverse rotation preventing mechanism in a fishing reel, comprising:

a reel casing;

a rotary shaft member adapted to transmit a rotational torque from a first member to a second member and to rotate relative to said reel casing;

said first member non-rotatably fitted on said rotary shaft member to rotate together with said rotary shaft member and formed with a first surface;

said second member rotatably fitted on said rotary shaft member and formed with a second surface radially facing said first surface with respect to an axis of said rotary shaft member;

a rolling member provided between said first and second surfaces;

first means for interlocking said rolling member with said first and second surfaces so that said first and second members are prevented from being rotated together when said rotary shaft member is rotated in a first direction and permitting said first and second members to rotate together when said rotary shaft member is rotated in a second direction opposite to said first direction; and second means for selectively preventing said second member from being rotated relative to said reel casing, said second means including an engagement portion formed in said second member and spaced from said second surface in a direction of said axis of said rotary shaft member.

2. The mechanism according to claim 1 wherein said rotary member includes a rotary quill to which a rotor of a spinning reel is fixed.

3. The mechanism according to claim 1 wherein said rotary member includes a drive shaft to which a handle for a double bearing type fishing reel is fixed.

4. The mechanism according to claim 1 wherein said second member includes a large diameter portion for defining said second surface and a small diameter portion for forming said engagement portion, said large diameter portion adjoining said small diameter portion in said direction.

5. A reverse rotation preventing mechanism in a fishing reel, comprising:

a reel casing;

a rotary member rotatable in first and second directions with respect to said reel casing;

one-way bearing means mounted on said rotary menber for preventing rotation of said rotary member, said one-way bearing means including a first engaging element rotatable in said first and second directions with respect to said reel casing, and a second engaging element supported by said reel casing and selectively engageable with said first engaging element;

wherein engagement between said first and second engaging elements positively inhibits rotation of said first engaging element in both said first and second directions, thereby actuating said one-way bearing means such that said rotary member is permitted to rotate in said first direction and said rotary member is prevented from rotating in said second direction.

6. A reverse rotation preventing mechanism according to claim 5, wherein said first engaging element is an outer race member of said one-way bearing means.

7. A reverse rotation preventing mechanism according to claim 6, wherein said first engaging element includes a rectangular notch.

8. A reverse rotation preventing mechanism according to claim 5, wherein said first engaging element includes a ratchet wheel having a rectangular notch between adjacent rachet teeth.

9. A reverse rotation preventing mechanism according to claim 5, wherein said first engaging element is an inner race member of said one-way bearing means.

10. A reverse rotation preventing mechanism according to claim 9, wherein said first engaging element includes a rectangular notch.

* * * * *